(12) United States Patent
Matsusue

(10) Patent No.: US 9,444,113 B2
(45) Date of Patent: Sep. 13, 2016

(54) FUEL CELL SYSTEM WITH WATER PRODUCTION CONTROL, AND VEHICLE EQUIPPED WITH THE SAME

(75) Inventor: Masaaki Matsusue, Mishima (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 13/985,073

(22) PCT Filed: Jun. 23, 2011

(86) PCT No.: PCT/JP2011/003601
§ 371 (c)(1),
(2), (4) Date: Aug. 13, 2013

(87) PCT Pub. No.: WO2010/111046
PCT Pub. Date: Aug. 23, 2012

(65) Prior Publication Data
US 2013/0323540 A1    Dec. 5, 2013

(30) Foreign Application Priority Data
Feb. 16, 2011  (JP) .................................. 2011-031000

(51) Int. Cl.
| H01M 12/00 | (2006.01) |
| H01M 8/04 | (2016.01) |
| H01M 8/10 | (2016.01) |

(52) U.S. Cl.
CPC ..... *H01M 8/04291* (2013.01); *H01M 8/04507* (2013.01); *H01M 8/04619* (2013.01); *H01M 8/04843* (2013.01); *H01M 2008/1095* (2013.01); *H01M 2250/20* (2013.01); *Y02E 60/50* (2013.01); *Y02P 70/56* (2015.11); *Y02T 90/32* (2013.01)

(58) Field of Classification Search
USPC .................................. 429/428, 430, 450, 413
See application file for complete search history.

(56) References Cited

U.S. PATENT DOCUMENTS

| 2004/0166387 | A1* | 8/2004 | Imamura et al. ............... 429/22 |
| 2004/0175602 | A1 | 9/2004 | Tahara |
| 2005/0084723 | A1 | 4/2005 | Mori |
| 2009/0297894 | A1* | 12/2009 | Davies et al. .................. 429/13 |
| 2010/0019729 | A1* | 1/2010 | Kaita et al. .................... 320/134 |
| 2010/0233560 | A1 | 9/2010 | Kajiwara |

FOREIGN PATENT DOCUMENTS

| JP | 2004-47427 | 2/2004 |
| JP | 2004-265862 | 9/2004 |
| JP | 2005-129252 | 5/2005 |
| JP | 2009-99341 | 5/2009 |
| JP | 2009-528657 | 8/2009 |

* cited by examiner

*Primary Examiner* — Gary Harris
(74) *Attorney, Agent, or Firm* — Finnegan, Henderson, Farabow, Garrett & Dunner, LLP

(57) ABSTRACT

The invention aims to reduce degradation of the power generation performance of a fuel cell during a prolonged high load operation with high effectiveness. A fuel cell vehicle correlates the dryness of an electrolyte membrane to the cell temperature, while performing power generation control of a fuel cell based on a power demand for a driving motor. When the cell temperature exceeds a first temperature α that indicates the increased dryness of the electrolyte membrane, the fuel cell vehicle intermittently repeats temporary current increase control that shifts the operation state of the fuel cell to the state of an increased electric current and a decreased voltage in a time period t, in order to increase the amount of water production on a cathode.

14 Claims, 13 Drawing Sheets

FUEL CELL SYSTEM WITH WATER PRODUCTION CONTROL, AND VEHICLE EQUIPPED WITH THE SAME

CROSS-REFERENCE TO RELATED APPLICATIONS

This application is a national phase application of International Application No. PCT/JP2011/003601, filed Jun. 23, 2011, and claims the priority of Japanese Application No. 2011-031000, filed Feb. 16, 2011, the content of both of which is incorporated herein by reference.

TECHNICAL FIELD

The present invention relates to a fuel cell system and a vehicle equipped with the same.

BACKGROUND ART

The vehicle equipped with the fuel cell system is configured to generate electric power with a fuel gas and an oxygen-containing gas respectively supplied to an anode and a cathode of a fuel cell and uses the generated electric power as a driving force. The power generation of the fuel cell produces water on the cathode, accompanied with the electrochemical reaction of hydrogen contained in the fuel gas, for example, hydrogen gas with oxygen contained in the oxygen-containing gas, for example, the air. An electrolyte membrane of the fuel cell generally has the favorable proton conductivity in an adequate wet state. A variety of methods have been proposed to use the produced water on the cathode for humidification of the electrolyte membrane (for example, Patent Literature 1).

CITATION LIST

Patent Literature

PTL1: JP 2005-129252A
PTL2: JP 2004-47427A

SUMMARY OF INVENTION

Technical Problem

The methods proposed by these patent literatures increase the amount of water production for the purpose of reducing the dryness of the electrolyte membrane, but still have the following need in the case of high load operation of the fuel cell that is likely to increase the dryness of the electrolyte membrane.

When the high load operation of the fuel cell is short-term, a shift of the operation state to the lower voltage level or reduction of the air supply for the purpose of increasing the amount of water production as described in the above patent literatures causes no substantial difficulty in operation during the high load operation term or after the high load operation term. The vehicle equipped with the fuel cell system, however, often needs a prolonged high load operation, such as long-distance uphill drive. The prolonged high load operation leads to the prolonged shift of the operation state to the lower voltage level or the prolonged reduction of the air supply. This may cause degradation of the power generation performance and may not allow a power demand for a load to be met by the electric power generated by the fuel cell. The prolonged high load operation continuously increases the amount of water production. This may cause pores in a cathode-side gas diffusion layer to be blocked by the produced water and interfere with diffusive supply of the gas (air), thereby causing degradation of the power generation performance. In a fuel cell system provided as a power generation apparatus that uses a fuel cell as a power source of electrical equipment, such high load operation may be prolonged. The above problem is accordingly not characteristic of the vehicle equipped with the fuel cell system.

By taking into account the above problem, the object of the invention is to reduce degradation of the power generation performance of a fuel cell during a prolonged high load operation with high effectiveness.

Solution to Problem

In order to achieve at least part of the foregoing, the invention provides aspects and embodiments described below.

Aspect 1: Fuel Cell System

According to a first aspect, there is provided a fuel cell system, comprising: a fuel cell configured to receive a fuel gas and an oxygen-containing gas respectively supplied to an anode and a cathode, which are placed to face each other across an electrolyte membrane having proton conductivity, and generate electric power; and a power generation controller configured to perform load-responding power generation control that controls power-generating operation of the fuel, cell based on a power demand for an external load. When the fuel cell is in a performance degradation state that has potential for degradation of power generation performance of the fuel cell, the power generation controller performs water production increasing control, which shifts a power-generating operation state of the fuel cell to a state of increasing an amount of water production on the cathode compared with the load-responding power generation control, and subsequently performs water production non-increasing control, which shifts the power-generating operation state of the fuel cell to a state of reducing an increase in amount of water production compared with the water production increasing control. The water production increasing control and the water production non-increasing control are alternately repeated in the performance degradation state.

The fuel cell system of the above configuration controls the power-generating operation of the fuel cell based on the power demand for the external load and thereby performs the load-responding power generation control responding to the power demand. When the fuel cell is in the performance degradation state that has potential for degradation of the power generation performance of the fuel cell during the load-responding power generation control, the fuel cell system of the above configuration performs the water production increasing control, which shifts the power-generating operation state of the fuel cell to the state of increasing the amount of water production on the cathode compared with the load-responding power generation control, and subsequently performs the water production non-increasing control, which shifts the power-generating operation state of the fuel cell to the state of reducing the increase in amount of water production compared with the water production increasing control. The water production increasing control and the water production non-increasing control are alternately repeated in the performance degradation state. Even when the high load operation of the fuel cell is prolonged, the operation state of the fuel cell that increases the amount of water production does not continue over the prolonged period but occurs only intermittently. This enables the increased, though intermittently, water production to contribute to reduction of the dryness of the electrolyte membrane. The water production, though its increase is reduced, during the water production non-increasing control performed subsequently to the water production increasing control also contributes to reduction of the dryness of the electrolyte membrane.

When the high load operation of the fuel cell is prolonged, there is a possibility that the high load caused by the power demand for the external load increases the dryness of the electrolyte membrane and causes degradation of the power generation performance during the load-responding power generation control based on the power demand. The fuel cell system of the above configuration, however, uses the increased, though intermittently, water production (increased amount of water production) by the water production increasing control in the performance degradation state and the water production, though its increase is reduced, by the water production non-increasing control to reduce the dryness of the electrolyte membrane and enable recovery of the power generation performance. Additionally, the water production during the water production non-increasing control occurs only between the intermittently performed water production increasing controls. The increased amount of water production during the water production increasing control subsequent to the water production non-increasing control is reduced, compared with the increased amount of water production during the water production increasing control. Such control prevents pores for diffusive gas supply from being blocked by the produced water to some extent. As a result, even when the high load operation of the fuel cell is prolonged, the fuel cell system of the above configuration reduces the dryness of the electrolyte membrane and prevents the pores from being blocked by the produced water, thereby reducing degradation of the power generation performance with the high effectiveness.

The electrochemical reaction of hydrogen with oxygen proceeds vigorously with an increase in amount of water production, and this reaction is an exothermic reaction. The electrolyte membrane is accordingly warmed by the heat of reaction to have a temperature rise, associated with an increase in amount of water production. The fuel cell system of the above configuration, however, performs the water production increasing control, which leads to the increased amount of water production, only intermittently as described above and accordingly reduces the temperature rise of the electrolyte membrane caused by the heat of reaction associated with the increase in amount of water production. Additionally, the water production non-increasing control subsequent to the water production increasing control reduces the increase in amount of water production and thereby reduces the temperature rise of the electrolyte membrane. The fuel cell system of the above configuration can also contribute to reduction of degradation of the power generation performance by reduction of the temperature rise of the electrolyte membrane.

In this case, drying of the electrolyte membrane may cause degradation of the power generation performance of the fuel cell. The dryness of the electrolyte membrane depends on the temperature of the fuel cell. The control procedure may detect the temperature of the fuel cell and estimate or determine the potential for degradation of the power generation performance of the fuel cell by drying of the electrolyte membrane when the detected fuel cell temperature reaches a predetermined temperature (first temperature). This simple control procedure can alternately repeat the water production increasing control and the water production non-increasing control and thereby contribute to reduction in degradation of the power generation performance described above by the simple technique of detecting the temperature and making a comparison of the detected temperature. The criterion for the estimation or the determination of a change in degradation of the power generation performance by drying of the electrolyte membrane is not limited to the change in fuel cell temperature but may be a change in any other fuel cell characteristic that reflects the dryness of the electrolyte membrane, for example, a change in internal resistance or a change in pressure loss during the gas supplies to the corresponding electrodes. The degradation of the power generation performance of the fuel cell may be observed as a change in battery resistance, as a change in battery output or as a change in current-voltage characteristic of the fuel cell, instead of as the change in dryness of the electrolyte membrane. The control procedure may thus measure or estimate a battery resistance, a battery output or a current-voltage characteristic and detect a shift to the performance degradation state that has potential for degradation of the power generation performance of the fuel cell.

The fuel cell system described above may be provided according to any of the following embodiments. According to an embodiment, the load-responding power generation control may be performed as the water production non-increasing control. This configuration reduces shortage of electric power by the power generation control based on the power demand for the external load (load-responding power generation control) while the water production increasing control is not performed.

According to another embodiment, the water production increasing control and the water production non-increasing control may be repeated alternately at a predetermined time interval T. This configuration enables the simple control.

According to another embodiment, the fuel cell system may shift the power-generating operation state of the fuel cell to a state of an increased electric current and a decreased voltage by the water production increasing control and thereby increase the amount of water production on the cathode. The fuel cell system may shift the power generating operation state of the fuel cell to a state of a lower electric current level and a higher voltage level by the water production non-increasing control than those by the water production increasing control and thereby reduce the increase in amount of water production compared with the water production increasing control. This readily accelerates the electrochemical reaction and definitely increases the amount of water production by simply increasing the electric current and decreasing the voltage.

Any of the following embodiments may be employed for the control that causes such a change in electric current and a change in voltage. According to an embodiment, the fuel cell system may store an equivalent power characteristic curve specific to the fuel cell with regard to each power generation level, wherein the equivalent power characteristic curve correlates an electric current to a voltage and indicates the power-generating operation state of the fuel cell. The fuel cell system may read an equivalent power characteristic curve of a power generation level corresponding to the power demand and control power-generating operation of the fuel cell to meet an electric current and a voltage on the read equivalent power characteristic curve, as the load-responding power generation control. In order to achieve the shift to the state of the increased electric current and the decreased voltage, the fuel cell system may control power-generating operation of the fuel cell to meet an electric current and a voltage on the equivalent power characteristic curve. According to this embodiment, in order to achieve the shift to the state of the increased electric current and the decreased voltage as the water production increasing control, the fuel cell system may read an equivalent power characteristic curve of a lower power generation level than the power generation level corresponding to the power demand and control power-generating operation of the fuel cell to meet an electric current and a voltage on the read equivalent power characteristic curve. Even when the power-generating operation of the fuel cell is shifted between the equivalent power characteristic curve for the load-responding power generation control and the equivalent power characteristic curve of the lower power generation level, the power-generating operation of the fuel cell with the electric current and the voltage on either of these two equivalent power characteristic curves enables the stable power output. The shift of the power-generating operation simply needs the control of the fuel cell but does not need power-generating operation control with additional consideration of the power supply from another power source, for example, a secondary battery that is capable of charging and discharging electric power.

According to one embodiment, the fuel cell system may further include a secondary battery capable of charging and discharging electric power to be usable in combination, with the fuel cell, as a power source to supply power to the load. The fuel cell system may alternately repeat the water production increasing control and the water production non-increasing control, so as to make a difference between the power demand for the load and a power output of the fuel cell by the shift to the state of the increased electric current and the decreased voltage associated with the water production increasing control equal to a difference between the power demand for the load and a power output of the fuel cell by the shift to the lower electric current level and the higher voltage level associated with the water production non-increasing control. This configuration prevents a variation in power supply from the secondary battery, which is used to compensate for shortage of electric power, thus reducing power consumption of the secondary battery.

According to another embodiment, the fuel cell system may further include a secondary battery capable of charging and discharging electric power to be usable in combination with the fuel cell, as a power source to supply power to the load. The fuel cell, system may determine availability or unavailability of the water production increasing control, based on a state of charge of the secondary battery. This configuration can adjust the frequency of execution of the water production increasing control according to the state of charge of the secondary battery and reduce the shortage relative to the power demand by the combined use of the secondary battery It may be determined that the water production increasing control is available when the state of charge of the secondary battery exceeds a predetermined charge level. This more effectively reduces the shortage of electric power relative to the power demand by the combined used of the secondary battery The fuel cell system enabling the combined use of the secondary battery may determine the shift of the power-generating operation state of the fuel cell to the state of the increased, electric current and the decreased voltage based on the state of charge of the secondary battery and perform the water production increasing control according to the determined shift. This configuration enables the water production increasing control that leads to the increased amount of water production to be performed adequately based on the state of charge of the secondary battery, in addition to the above advantageous effects accompanied by the combined use of the secondary battery. This contributes to reduction of the dryness of the electrolyte membrane and resulting recovery of the power generation performance.

According to another embodiment, the fuel cell system may stop the water production increasing control on cancellation of the power demand for the load after intermittently repeating the water production increasing control. The fuel cell system may intermittently repeat the water production increasing control over a predetermined time period in a load cancellation term until appearance of a new power demand for the load after cancellation of the power demand. This configuration has the following advantageous effects.

Cancellation of the power demand for the load generally stops power generation control of the fuel cell based on the power demand for the external load (load-responding power generation control), while stopping the water production increasing control. Such control stop is after intermittent repetition of the water production increasing control and may thus be in a state after continuation of the high load operation. During continuation of the high load operation, the water production increasing control is performed to increase the amount of water production and thereby reduce the dryness of the electrolyte membrane as described above. Even after the state change from the high load operation to the state of cancellation of the power demand, the fuel cell is expected to have a relatively high temperature. There is accordingly a possibility that the dryness of the electrolyte membrane is increased at this fuel cell temperature. The above embodiment, however, intermittently repeats the water production increasing control over the predetermined time period in the load cancellation term until appearance of a new power demand for the load after cancellation of the power demand. This reduces the dryness of the electrolyte membrane at the fuel cell temperature. As a result, after elapse of the load cancellation term, i.e., on appearance of a new power demand for the load, the power generation performance has been recovered by some degree corresponding to the reduced dryness of the electrolyte membrane. This accordingly enables power generation control of the fuel cell based on this new power demand without any substantial difficulty. In an application of the fuel cell system of the above configuration on a vehicle, this prevents the driver of the vehicle from feeling strange with a response to the driver's accelerator operation and thereby improves the drivability.

According to the above embodiment, the fuel cell system may perform the water production increasing control in the load cancellation term in a state estimated to have degradation of the power generation performance of the fuel cell by drying of the electrolyte membrane. For example, the water production increasing control in the load cancellation term may be performed when a detected fuel cell, temperature of the fuel cell decreases from a temperature where the power demand is cancelled to a predetermined temperature.

According to another embodiment, the fuel cell system may intermittently reduce a supply of the oxygen-containing gas during repetition of the water production increasing control. The reduced supply of the oxygen-containing gas leads to reduction in amount of water production but decreases the amount of produced water taken away by the gas flow, thus enabling the produced water to remain. This increases the amount of water production per gas supply and may thus contribute to reduction of the dryness of the electrolyte membrane. This means that the effect of reducing the dryness is achievable without increasing the absolute amount of water production. According to this embodiment, the reduced supply of the oxygen-containing gas reduces the consumption of the fuel gas, thus contributing to reduction of the dryness of the electrolyte membrane and enabling improvement of the fuel consumption.

Aspect 2: Fuel Cell Vehicle

According to a second aspect, there is provided a vehicle equipped with the fuel cell system of any of the above configurations, wherein electric power generated by the fuel cell included in the fuel cell system is used as a driving force.

Even when the high load operation of the fuel cell is prolonged, the vehicle of this configuration also reduces degradation of the power generation performance during this prolonged period with the high effectiveness. This enhances the driving performance of the vehicle, such as long-distance uphill drive, associated with the prolonged high load operation.

The present invention may also be applied to an operation method of a fuel cell and a stationary power generation system including a fuel cell system and using a fuel cell as a power generation source.

DESCRIPTION OF EMBODIMENTS

Figure 1:
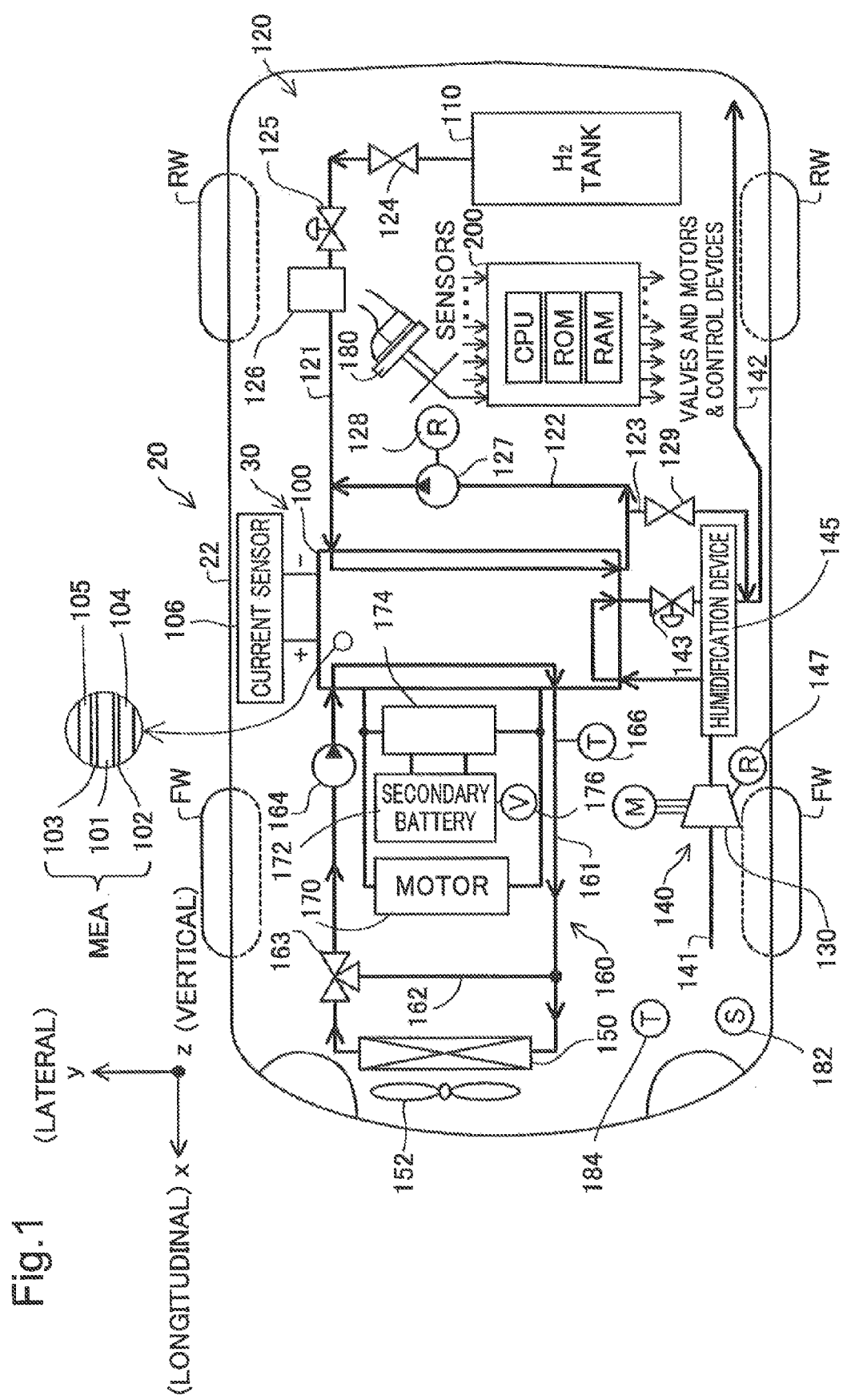
FIG. 1 is a diagram schematically illustrating a plan view of a fuel cell vehicle 20 according to an embodiment of the invention.

The following describes embodiments of the invention with reference to the drawings. FIG. 1 is a diagram schematically illustrating a plan view of a fuel cell vehicle 20 according to an embodiment of the invention.

As illustrated, this fuel cell vehicle 20 includes a fuel cell system 30 mounted on a vehicle body 22. This fuel cell system 30 has a fuel cell 100, a hydrogen gas supply system 120 including a hydrogen gas tank 110, an air supply system 140 including a motor-driven compressor 130, a cooling system 160 including a radiator 150 and a fan 152, a secondary battery 172 and a DC-DC converter 174. The fuel cell system 30 supplies electric power generated by the fuel cell 100 or electric power charged in the secondary battery 172 to loads, such as a motor 170 for driving front wheels.

As illustrated in an enlarged diagram of FIG. 1, the fuel cell 100 is structured by stacking battery cells, each, battery cell including a membrane electrode assembly (MEA) having two electrodes, i.e., an anode 102 and a cathode 103, formed on respective side faces of an electrolyte membrane 101. The fuel cell 100 is placed between front wheels FW and rear wheels RW under the vehicle floor. The battery cell also includes an anode-side gas diffusion layer 104 and a cathode-side gas diffusion layer 105, which are placed on both sides of the electrolyte membrane 101 with the electrodes formed thereon. The respective gas diffusion layers are joined with the corresponding electrodes. Gas separators are further placed outside of the respective gas diffusion layers. The respective gas separators serve to supply a hydrogen-containing fuel gas and an oxygen-containing oxidizing gas (the air in this embodiment) to the corresponding gas diffusion layers, while serving to collect electric power from the battery cell.

The electrolyte membrane 101 is a proton-conducting ion exchange membrane made of a solid polymer material, for example, a fluororesin and shows good electrical conductivity in the wet state. The anode 102 and the cathode 103 respectively have a catalyst (for example, platinum or platinum alloy) and are formed by supporting the catalyst on an electrically conductive carrier (for example, carbon particles). The anode-side gas diffusion layer 104 and the cathode-side gas diffusion layer 105 are respectively made from an electrically conductive porous member having gas permeability, for example, carbon paper or carbon cloth, used as the porous base material.

The fuel cell 100 generates electric power through an electrochemical reaction of hydrogen contained in the hydrogen gas and oxygen contained in the air, which are respectively supplied from the hydrogen gas supply system 120 and the air supply system 140 described below, proceeding in the respective battery cells described above, and drives the loads such as the motor 170 with the generated electric power. The state of power generation in the fuel cell 100 is measured by a current sensor 106, and its measurement result is output from the current sensor 106 to a controller 200 described later.

The hydrogen gas supply system 120 includes a hydrogen supply path 121 arranged from the hydrogen gas tank 110 to the fuel cell 100, a circulation path 122 arranged to circulate unconsumed hydrogen gas (anode off gas) to the hydrogen supply path 121 and a release path 123 arranged to release the anode off gas to the atmosphere. This hydrogen gas supply system 120 supplies the hydrogen gas stored in the hydrogen gas tank 110 to the fuel gas 100 (more specifically, to the anodes 102 of the respective battery cells) through path open/close control of an on-off valve 124 and pressure reduction by a pressure reducing valve 125 in the hydrogen supply path 121. More specifically, the hydrogen gas supply system 120 supplies the hydrogen gas to the anodes of the fuel cell 100 at a total flow rate that is the sum of a flow rate controlled by a hydrogen supply device 126 in the downstream of the pressure reducing valve 125 and a circulation flow rate controlled by a circulation pump 127 in the circulation path 122. The hydrogen gas supply is determined in response to an operation of an accelerator 180 by the controller 200 described later to be a supply amount according to a load required for the fuel cell 100. The hydrogen gas supply system 120 occasionally releases the anode off gas to the atmosphere through open/close control of an on-off valve 129 in the release path 123 branched off from the circulation path 122.

The air supply system 140 includes an oxygen supply path 141 arranged through the compressor 130 to the fuel cell 100 and a release path 142 arranged to release the unconsumed air (cathode off gas) to the atmosphere. This air supply system 140 supplies the air, which is taken in from an open end of the oxygen supply path 141 and is subjected to flow control by the compressor 130, to the fuel cell 100 (more specifically, to the cathodes 103 of the respective battery cells), while releasing the cathode off gas through the release path 142 to the atmosphere at a flow rate controlled by a discharge flow control valve 143 in the release path 142. In such case that the air supply system 140 serves to supply the air with releasing the cathode off gas, the air supply system 140 adjusts the discharge flow control valve 143 in the oxygen supply path 141 to a predetermined position and then supplies the air by the compressor 130. As in the case of the hydrogen gas supply, the air supply is determined in response to the operation of the accelerator 180 by the controller 200 to be a supply amount according to the load required for the fuel cell 100. The discharge flow control valve 143 performs the flow control to regulate the back pressure on the cathode side.

The air supply system 140 includes the oxygen supply path 141 and the release path 142 arranged to go through a humidification device 145. This humidification device 145 is structured as a gas-liquid separator to separate water from the cathode off gas and add the separated water in the form of water vapor to the air passing through the discharge flow control valve 143.

The cooling system 160 includes a circulation path 161 arranged to circulate a cooling medium from the radiator 150 to the fuel cell 100, a bypass path 162, a three-way flow control valve 163 at the meeting point of the paths, a circulation pump 164 and a temperature sensor 166. This cooling system 160 introduces the cooling medium, which is subjected to heat exchange by the radiator 150, through the circulation path 161 to an inner-cell circulation path (not shown) of the fuel cell 100, so as to cool down the fuel cell 100 to a predetermined temperature. In this case, the driving amount of the circulation pump 164, i.e., the circulation supply of the cooling medium, and the flow rate controlled by the three-way flow control valve 163 are determined by the controller 200 according to the fuel cell temperature (cell temperature) as the temperature detected by the temperature sensor 166 and the state of power generation detected by the current sensor 106.

The secondary battery 172 is connected with the fuel cell 100 via a DC-DC converter 174. The secondary battery 172 serves as a separate power source from the fuel cell 100 and is used in combination with the fuel cell 100, as the power source for supplying power to, for example, the motor 170. This embodiment is on the assumption that the fuel cell 100 is under operation control (ordinary control) in the state of power generation corresponding to the depression of the accelerator 180 as described later. In the operation stop state of the fuel cell 100, the secondary battery 172 accordingly serves to supply the electric power charged therein to the motor 170. The secondary battery 172 may be, for example, a lead-acid battery, a nickel hydride battery or a lithium ion battery. A capacity sensor 176 is connected with the secondary battery 172 to detect the state of charge of the secondary battery 172 and output the detected state of charge (battery capacity) to the controller 200.

The DC-DC converter 174 has the charge discharge control functions to control charge and discharge of the secondary battery 172. The DC-DC converter 174 controls charge and discharge of the secondary battery 172, in response to a control signal from the controller 200. The DC-DC converter 174 also performs extraction of the electric power generated by the fuel cell 100 and the electric power accumulated in the secondary battery 172 and application of the voltage to the motor 170 under control of the controller 200 to variably control the state of extraction of electric power and the voltage level applied to the motor 170.

The controller 200 is structured by a microcomputer including a CPU that performs logical operations, a ROM and a RAM, and performs various controls of the fuel cell vehicle 20 on reception of sensor outputs from, for example, the accelerator 180. For example, the controller 200 determines the power demand for the motor 170 according to the operating state of the accelerator 180. The controller 200 then controls the power generation of the fuel cell 100, in order to meet the power demand by power generation of the fuel cell 100, by the electric power charged in the secondary battery 172 or by their combination, while supplying the electric power to the motor 170. When the power demand for the motor 170 is met by power generation of the fuel cell 100, the controller 200 controls the gas supplies from the hydrogen gas supply system 120 and the air supply system 140 (ordinary control) to meet the power demand. The controller 200 additionally controls the DC-DC converter 174 according to the power demand for the motor 170. The controller 200 also receives, for example, the vehicle speed detected by a vehicle speed sensor 182, the ambient temperature detected by an ambient temperature sensor 184, the hydrogen gas flow rate detected by a flow rate sensor 128 in the hydrogen gas supply system 120, the air flow rate detected by a flow rate sensor 147 in the air supply system 140 and the state of charge (hereinafter referred to as SOC) of the secondary battery 172 detected by the capacity sensor 176, as control parameters used for the controls described above. This controller 200 performs power-generating operation control (load-responding power generation control) based on the power demand for an external load and water production increasing control in the fuel cell system according to the first aspect or in, the vehicle according to the second aspect described previously.

Figure 2:
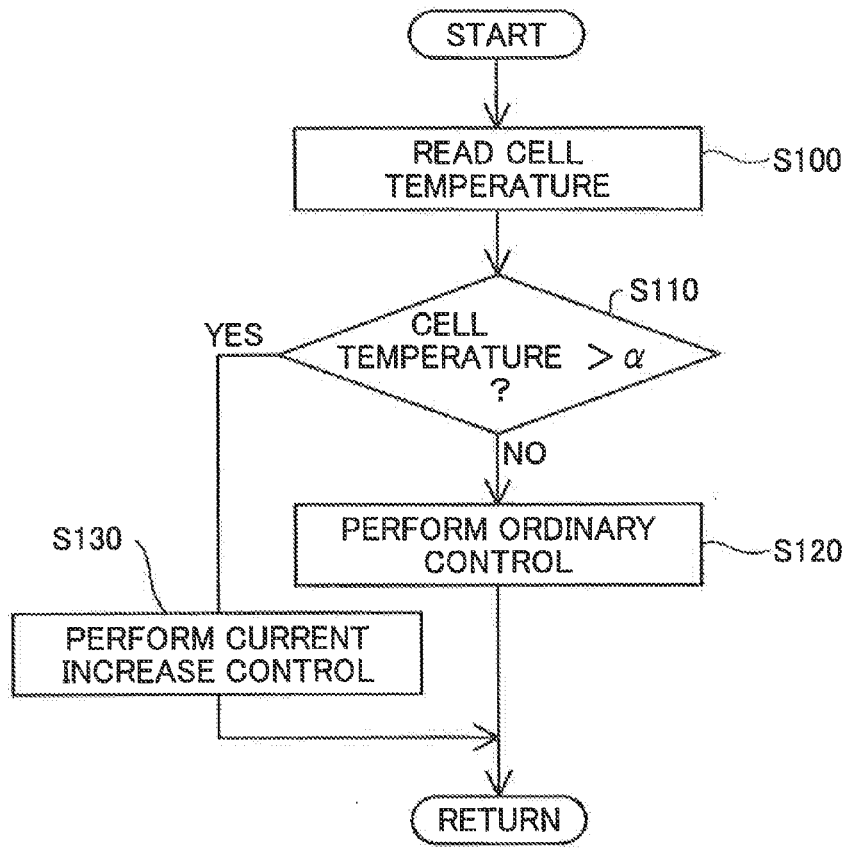
FIG. 2 is a flowchart showing a procedure of current increase control.
Figure 3:
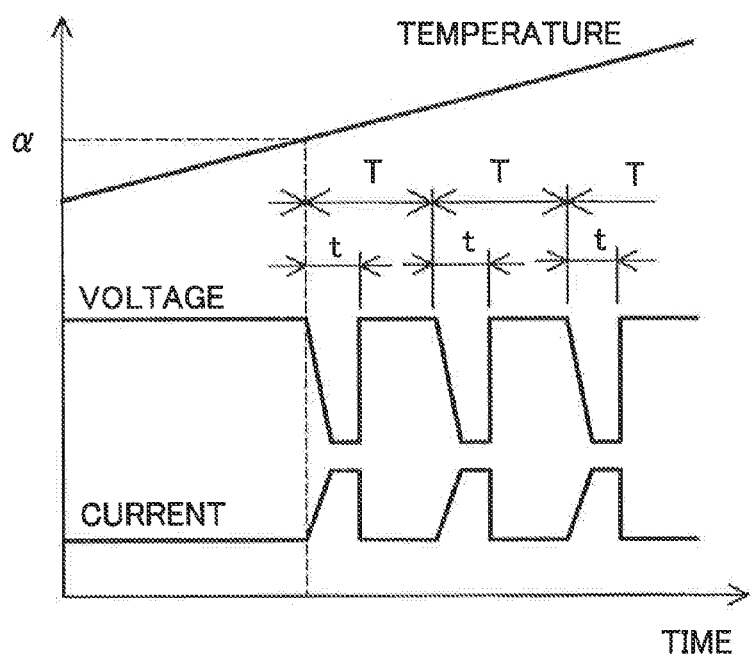
FIG. 3 is a diagram illustrating the details of the current increase control.
Figure 4:
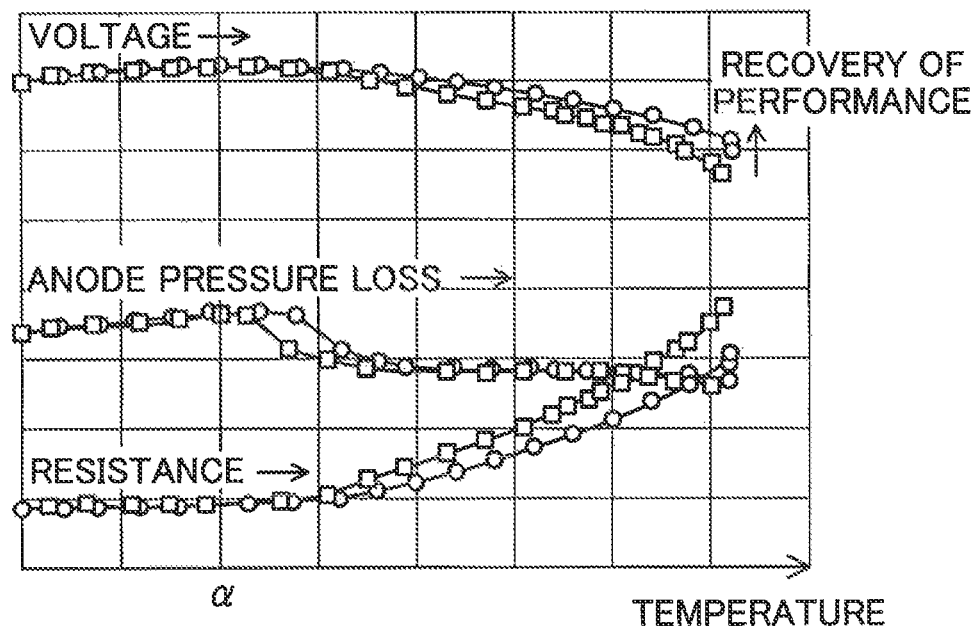
FIG. 4 is a graph showing changes in internal resistance, changes in anode pressure loss, and changes in power generation voltage of a fuel cell 100 against the cell temperature with and without the current increase control.

The following describes a process performed by the controller 200 of the fuel cell vehicle 20 having the above configuration to reduce the dryness of the electrolyte membrane. The process according to this embodiment shifts the power generating operation state of the fuel cell 100 to the state of an increased electric current and a decreased voltage, so as to increase the water production. FIG. 2 is a flowchart showing a procedure of current increase control. FIG. 3 is a diagram illustrating the details of the current increase control. FIG. 4 is a graph showing changes in internal resistance, changes in anode pressure loss, and changes in power generation voltage of the fuel cell 100 against the cell temperature with and without the current increase control.

As shown in FIG. 2, the controller 200 first scans the temperature sensor 166 located in the downstream of the fuel cell 100 to read the cell temperature of the fuel cell 100 (step S100). The cell temperature reflects the temperature of the electrolyte membrane 101 of the fuel cell 100. The dryness of the electrolyte membrane 101 is thus estimable from the read cell temperature. It is then determinable whether the power generation performance of the fuel cell 100 may be degraded by drying of the electrolyte membranes 101, based on the estimated dryness of the membrane. The controller 200 subsequently determines whether the read cell temperature exceeds a predetermined first temperature $\alpha$ (step S110). This first temperature $\alpha$ is a reference temperature that suggests an increase in dryness of the electrolyte membrane 101 and is used to determine the need to reduce the dryness of the membrane and thereby reduce degradation of the power generation performance of the fuel cell 100 caused by drying of the membrane. The first temperature $\alpha$ is predetermined by taking into account the temperature dependency of the power generation characteristic of the fuel cell 100 and the specification of the battery cells. For example, as shown in FIG. 4, without temporary current increase control described later, the anode pressure loss of the fuel cell 100 starts decreasing at a specified temperature as plotted with open squares. This is because an increase in dryness of the electrolyte membrane 101 leads to reduction in water content of the anode gas and resulting reduction of the pressure loss. The temperature at which the anode pressure loss starts decreasing may accordingly be specified as the first temperature $\alpha$. According to this embodiment, the first temperature $\alpha$ is determined by this method. Without the temporary current increase control described later, the inner resistance, on the other hand, starts increasing at a specified temperature as plotted with open squares in FIG. 4. The temperature close to this inflection point may thus be alternatively specified as the first temperature $\alpha$.

A negative answer at step S110 indicates no need to reduce the dryness of the electrolyte membrane 101, since the cell temperature is not higher than the first temperature $\alpha$. The controller 200 accordingly performs ordinary control of the fuel cell 100 (step S120). In the ordinary control, as described above, the controller 200 determines the power demand for the motor 170 according to the operating state of the accelerator 180, performs power generation control of the fuel cell 100 accompanied with gas supply control to control the gas supplies from the hydrogen gas supply system 120 and the air supply system 140 in order to meet the power demand, and supplies the generated electric power to the motor 170. When the power demand for the motor 170 is low electric power, the controller 200 may supply the electric power charged in the secondary battery 172 to the motor 170, instead of the electric power from the fuel cell 100. When the power demand for the motor 170 is high electric power, on the other hand, the controller 200 may perform power generation control of the fuel cell 100 to meet the power demand as the sum of the electric power from the fuel cell 100 and the electric power from the secondary battery 172 and supply electric power to the motor 170. FIG. 3 shows the state of ordinary control of the fuel cell 100 with a constant voltage and a constant current on the assumption of a fixed operating state of the accelerator 180 during an increase in cell temperature to the first temperature $\alpha$. In the case that the operating state of the accelerator 180 changes during this temperature increase, the ordinary control may adjust the voltage level and the current level according to such a change.

An affirmative answer at step S110, on the other hand, suggests an increase in dryness of the electrolyte membrane 101 and indicates the need to reduce the dryness of the electrolyte membrane 101, since the cell temperature exceeds the first temperature $\alpha$. The controller 200 accordingly performs current increase control of the fuel cell 100 (step S130). This current increase control is repeated at predetermined time intervals T after the time when the control procedure shifts to the current increase control, i.e., after the time when the cell temperature reaches the first temperature $\alpha$. More specifically, the current increase control repeats a control phase to shift the operation state of the fuel cell 100 to the state of an increased electric current and, a decreased voltage in a time period t (hereinafter referred to as temporary current increase control) and a subsequent control phase to perform the ordinary control described above after the time period t. In the case that the operating state of the accelerator 180 changes during the temperature increase to the first temperature $\alpha$ as described above, the voltage level and the current level adjusted during the ordinary control at the time when the cell temperature reaches the first temperature $\alpha$ are shifted to the increased electric current and the decreased voltage in the time period t. During such temporary current increase control, the controller 200 uses the secondary battery 172 in combination with the fuel cell 100 to meet the power demand. When the cell temperature decreases again to the first temperature $\alpha$ after increasing to exceed the first temperature $\alpha$, the temporary current increase control is terminated on an affirmative answer at step S110. The temporary current increase control to shift the operation state of the fuel cell 100 to the state of the increased electric current and the decreased voltage and the ordinary control based on the required load are thus alternately repeated, in the state that the cell temperature exceeds the first temperature $\alpha$ and increases the dryness of the electrolyte membrane 101, which may cause degradation of the power generation performance of the fuel cell 100.

As described above, the fuel cell, vehicle 20 of the embodiment correlates the dryness of the electrolyte membrane 101 to the cell temperature, while performing ordinary control of the fuel cell 100 based on the power demand for the secondary battery 172. When the cell temperature exceeds the first temperature $\alpha$ (affirmative answer at step S110), the fuel cell vehicle 20 suggests an increase in dryness of the electrolyte membrane 101 and determines the need to reduce the dryness of the membrane and thereby reduce degradation of the power generation performance of the fuel cell 100 caused by drying of the membrane. The fuel cell vehicle 20 then repeatedly performs the current increase control at the time intervals T to intermittently repeat the temporary current increase control to shift the operation state of the fuel cell 100 to the state of the increased electric current and the decreased voltage in the time period t. Such temporary current increase control, which causes a shift to the increased electric current and the decreased voltage, increases the consumption of hydrogen gas per unit time with the increase in electric current and the decrease in voltage and accelerates the electrochemical reaction, so as to increase the water production on the cathode 103. In other words, the fuel cell vehicle 20 according to the embodiment intermittently repeats the temporary current increase control, which leads to the increased water production, during the high load operation when the cell temperature exceeds the first temperature α and increases the dryness of the electrolyte membrane 101. Intermittently performing the temporary current increase control leads to intermittently increasing the water production. Even when the high load operation that is likely to increase the dryness of the electrolyte membrane 101 is prolonged, the operation state of the fuel cell 100 that increases the amount of water production does not continue over the prolonged period but occurs only intermittently. This enables the increased, though intermittently, water production to contribute to reduction of the dryness of the electrolyte membrane 101. The ordinary control during the time period (T-t) subsequent to the temporary current increase control during the time period t shifts the operation state of the fuel cell 100 to the lower current level and the higher voltage level than those by the temporary current increase control as shown in FIG. 3. This reduces the increase of water production, compared with the temporary current increase control. The water production, though its increase is reduced, during the ordinary control subsequent to the temporary current increase control also contributes to reduction of the dryness of the electrolyte membrane 101. The amount of water production on the cathode 103 is increased only by the temporary current increase control performed intermittently in the time period t. The increased, amount of water production during the ordinary control subsequent to the temporary current increase control is reduced, compared with the increased amount of water production during the temporary current increase control. The control procedure accordingly prevents the pores in the anode-side gas diffusion layer 104 and the cathode-side gas diffusion layer 105 for diffusive gas supply from being blocked by the produced water to some extent.

Alternately repeating the temporary current increase control in the time period t and the ordinary control based on the power demand for the motor 170 at the time intervals T reduces the shortage of electric power relative to the power demand for the motor 170. Even when the high load caused by the power demand for the motor 170 increases the dryness of the electrolyte membrane 101 and causes degradation of the power generation performance of the fuel cell 100 during the ordinary control (step S120) based on the power demand, the increased water production during the temporary current increase control subsequent to the ordinary control (see FIG. 3) and the water production during the ordinary control subsequent to the temporary current increase control contribute to reduction of the dryness of the electrolyte membrane 101 and recovery of the power generation performance of the fuel cell 100. As a result, even when the high load operation of the fuel cell 100 is prolonged, the fuel cell vehicle 20 equipped with the fuel cell system 30 according to this embodiment can maintain the power generation performance or reduce degradation of the power generation performance with the high effectiveness and contribute to the recovery of power generation performance.

Additionally, the fuel cell vehicle 20 according to the embodiment correlates the dryness of the electrolyte membrane 101 to the cell temperature. The cell temperature exceeding the first temperature α (affirmative answer at step S110) suggests the shift of the dryness of the electrolyte membrane 101 to a specific state (first dry state). It can thus be estimated that the power generation performance of the fuel cell 100 is degraded by drying of the electrolyte membrane 101. When the cell temperature exceeds the first temperature α, the fuel cell vehicle 20 determines the need for the temporary current increase control (step S130) described above and performs this temporary current increase control for the purpose of reducing the dryness of the electrolyte membrane 101 and thereby reducing degradation of the power generation performance of the fuel cell 100 caused by drying of the membrane. This control procedure can thus readily achieve reduction of the dryness of the electrolyte membrane 101 and resulting reduction of degradation of the power generation performance by the simple technique of detecting the cell temperature of the fuel cell 100 and making a comparison of the detected cell temperature.

In order to reduce the dryness of the membrane and thereby reduce degradation of the power generation performance, it is only necessary for the fuel cell vehicle 20 according to the embodiment to perform the increase/decrease control of the electric current and the voltage during the temporary current increase control and the subsequent ordinary control as shown in FIG. 3. There is accordingly no need to perform the control of system auxiliary machinery involved in the operation of the fuel cell, for example, charge-discharge control of the secondary battery 172 and humidification control of the humidification device 145, in relation to reduction of the dryness of the membrane, so that the control procedure can be simplified.

In the fuel cell vehicle 20 according to the embodiment, the anode 102 and the cathode 103 of the fuel cell 100 are respectively formed by supporting a catalyst, such as platinum or platinum alloy, on the carrier, for example, carbon particles. The catalyst such as platinum or platinum alloy is likely to degrade under the high temperature environment. The fuel cell vehicle 20 according to the embodiment increases the water production and cools down the catalyst with the produced water when the cell temperature exceeds the first temperature α, as described above. The produced water also serves to wash out the impurities adsorbed on the catalyst. Such reduction in catalyst performance loss also contributes to maintenance of the power generation performance of the fuel cell 100, reduction of degradation of the power generation performance and recovery of the power generation performance.

The following describes the advantageous effects associated with reduction of the dryness of the membrane with reference to the drawing. When the temporary current increase control of step S130 is not performed, as plotted with open squares in FIG. 4, the anode pressure loss is reduced with an increase in cell temperature from the first temperature α. When the temporary current increase control of step S130 is performed, on the other hand, as plotted with open circles in FIG. 4, the anode pressure loss is maintained to an extent even when the cell temperature increases from the first temperature α. The plot with open squares suggests an increase in dryness of the electrolyte membrane 101, which leads to reduction in water content of the anode gas and resulting reduction of the pressure loss. The plot with open circles, on the other hand, indicates an increase of water production by the temporary current increase control of step S130, which leads to the delayed reduction in water content of the anode gas and resulting delayed drying of the electrolyte membrane 101. The fuel cell vehicle 20 according to this embodiment thus enables delayed drying of the electrolyte membrane 101.

The temporary current increase control of step S130 is performed to reduce an increase in internal resistance as plotted with open circles in FIG. 4 even when the cell temperature increases from the first temperature α. The increase in internal resistance leads to degradation of the power generation performance. The fuel cell vehicle 20 according to this embodiment can thus reduce degradation of the performance of the fuel cell 100. This means the reduced degree of the voltage decrease and the contribution to recovery of the performance.

The electrochemical reaction of hydrogen with oxygen (exothermic reaction) proceeds vigorously with an increase in amount of water production by the temporary current increase control described above. The electrolyte membrane 101 is warmed by the heat of reaction to have a temperature rise, associated with an increase in amount of water production by the temporary current increase control. The fuel cell system 30 according to the embodiment, however, performs the temporary current increase control, which leads to the increased amount of water production, only intermittently at the time intervals T as described above and accordingly reduces the temperature rise of the electrolyte membrane 101 caused by the heat of reaction associated with the increase in amount of water production. Additionally, the ordinary control subsequent to this temporary current increase control reduces the increase in amount of water production and thereby decreases the heat of reaction to reduce the temperature rise of the electrolyte membrane 101. The fuel cell system 30 according to this embodiment can also contribute to reduction of degradation of the power generation performance of the fuel cell 100 by reduction of the temperature rise of the electrolyte membrane 101 caused by the heat of reaction.

The time interval T in which the temporary current increase control that leads to the increased, water production and the subsequent ordinary control are repeated may be determined experimentally or may be determined according to the thermal specification, such as the thermal capacity of the fuel cell 100. For example, the procedure may measure a change in cell temperature of the fuel cell 100 with varying the time interval T and the time period t and specify the available ranges of the time interval T and the time period t that achieve the recovery of the power generation performance of the fuel cell 100, which is degraded by drying of the electrolyte membrane 101. The time interval T and the time period t may then be selected in the ranges specified by this method.

The fuel cell vehicle 20 is driven in various environments, so that the time interval T may be determined according to the environment, in which the fuel cell system 30 is placed. For example, at the high environmental humidity, the moisture component (water vapor) prevents the electrolyte membrane 101 from being dried, so that the time interval T may be extended to decrease the frequency of the temporary current increase control. At the low environmental temperature, the degree of voltage decrease may be enhanced by the temporary current increase control. This leads to the accelerated temperature rise of the electrolyte membrane 101 by the heat of reaction associated with the temporary current increase control but causes no substantial problem, since the low environmental temperature accelerates cooling of the fuel cell 100 and thereby the electrolyte membrane 101.

Figure 5:
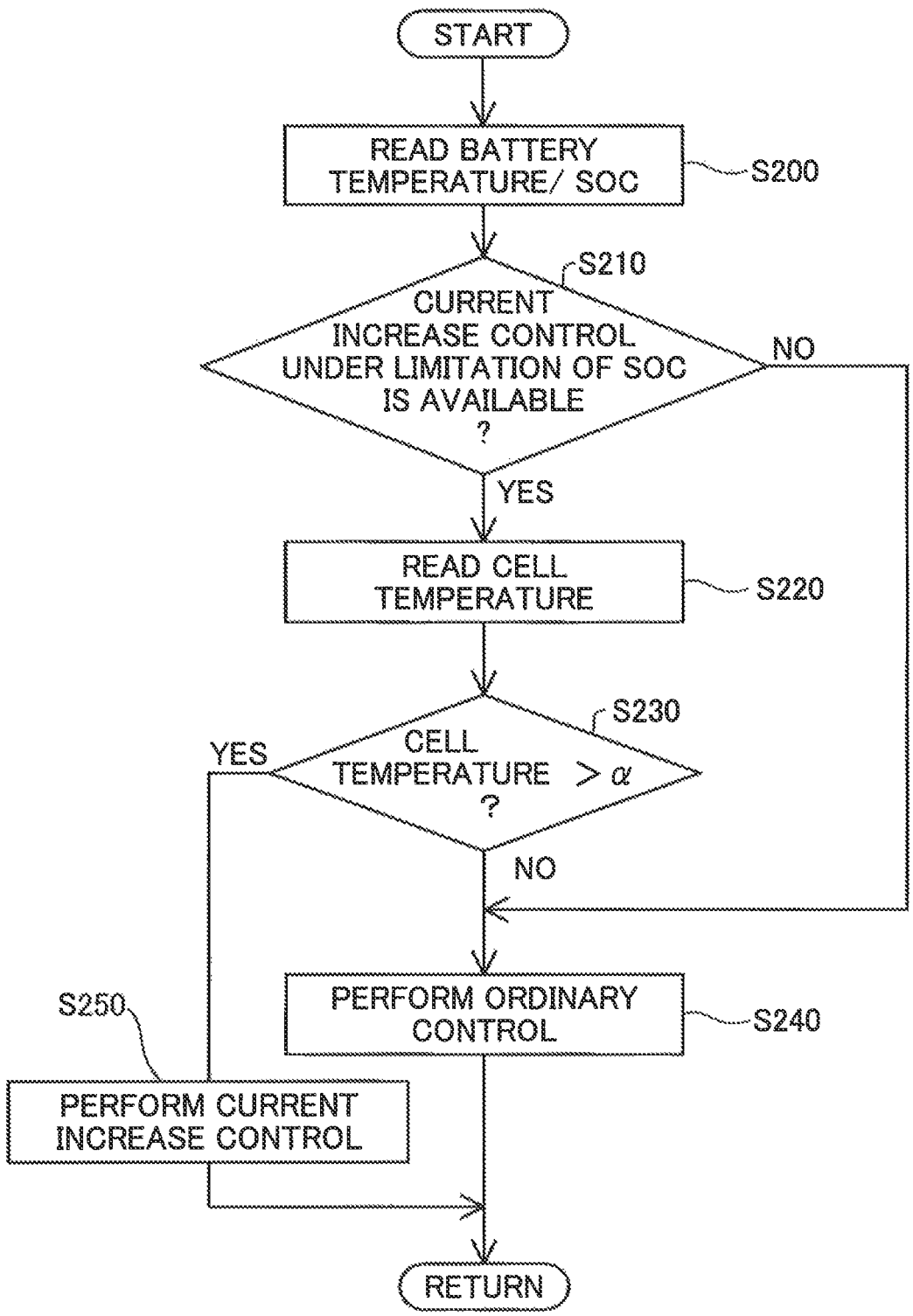
FIG. 5 is a flowchart showing a procedure of current increase control according to a second embodiment.
Figure 6:
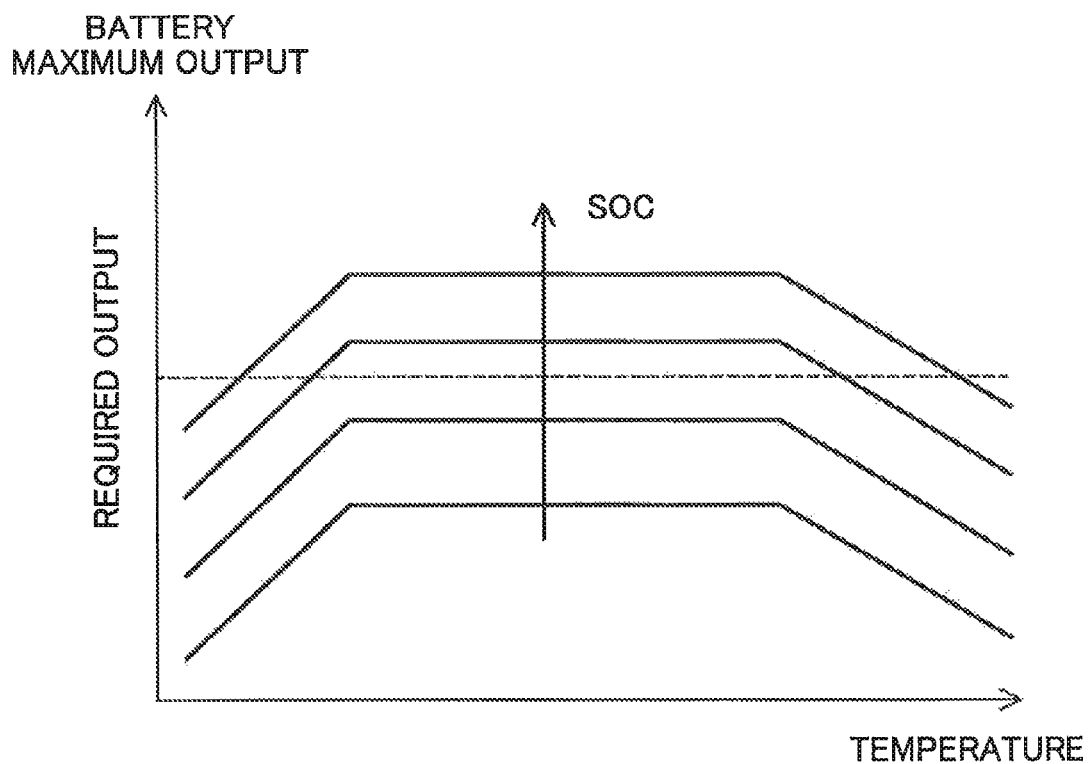
FIG. 6 is a diagram showing the relationship between the maximum output of a secondary battery 172 and the battery temperature with respect to different states of charge (SOC)
Figure 7:
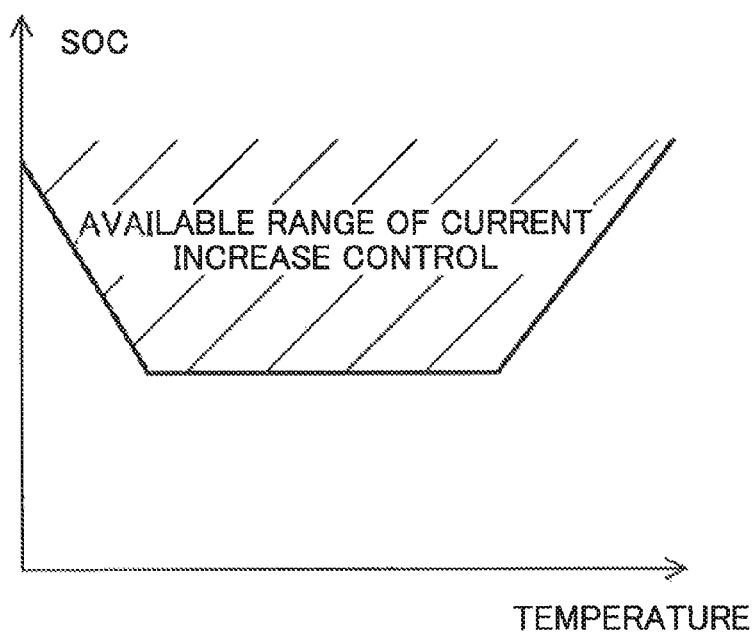
FIG. 7 is a diagram showing a map which is referred to for determination of the availability or unavailability of temporary current increase control.

The following describes another embodiment. FIG. 5 is a flowchart showing a procedure of current increase control according to a second embodiment. FIG. 6 is a diagram showing the relationship between the maximum output of the secondary battery 172 and the battery temperature with respect to different states of charge (SOC). FIG. 7 is a diagram showing a map which is referred to for determination of the availability or unavailability of temporary current increase control. The second embodiment is characterized by consideration of the SOC of the secondary battery 172 to determine whether the temporary current increase control is to be performed.

According to this embodiment, as shown in FIG. 5, the controller 200 first scans the ambient temperature sensor 184 and the capacity sensor 176 to read the battery temperature and the SOC of the secondary battery 172 (step S200). In this step, a temperature sensor may be attached to the secondary battery 172, and the battery temperature may be directly read from the temperature sensor. The secondary battery 172 has various SOC levels as shown in FIG. 6 as the result of discharging and charging but has the reduced maximum output with regard to each SOC in the low temperature range and in the high temperature range of the battery temperature. The required output shown by the dotted line in FIG. 6, i.e., the power demand for the motor 170, on the other hand, changes according to the operating state of the accelerator 180. The power demand may thus not be met by the SOC of the secondary battery 172. For example, the curve of the lowermost SOC and the curve of the second lower SOC do not meet the required output shown in FIG. 6 over the entire range of the battery temperature. The curve of the upper-most SOC and the curve of the second upper SOC, on the other hand, meet the required output shown in FIG. 6 in the limited battery temperature range. The shortage of electric power that is not met by the SOC of the secondary battery 172 can be supplied by the electric power generated by the fuel cell 100. It is, however, undesirable to operate the fuel cell 100 in the operating state that increases the dryness of the electrolyte membrane 101 for the purpose of compensating for the shortage by the electric power generated by the fuel cell 100, since such operation leads to a further increase in dryness of the electrolyte membrane 101 and degradation of the power generation performance. The procedure of this embodiment accordingly takes into account the temperature characteristics of the secondary battery 172 shown in FIG. 6 and determines the availability or the unavailability of the above temporary current increase control of the fuel cell 100 in relation to the SOC and the battery temperature of the secondary battery 172 as shown in FIG. 7. At step S210 subsequent to the sensor scans, the controller 200 refers to the map of FIG. 7 and determines the availability or the unavailability of the temporary current increase control, based on the battery temperature and the SOC read at step S200.

Figure 8:
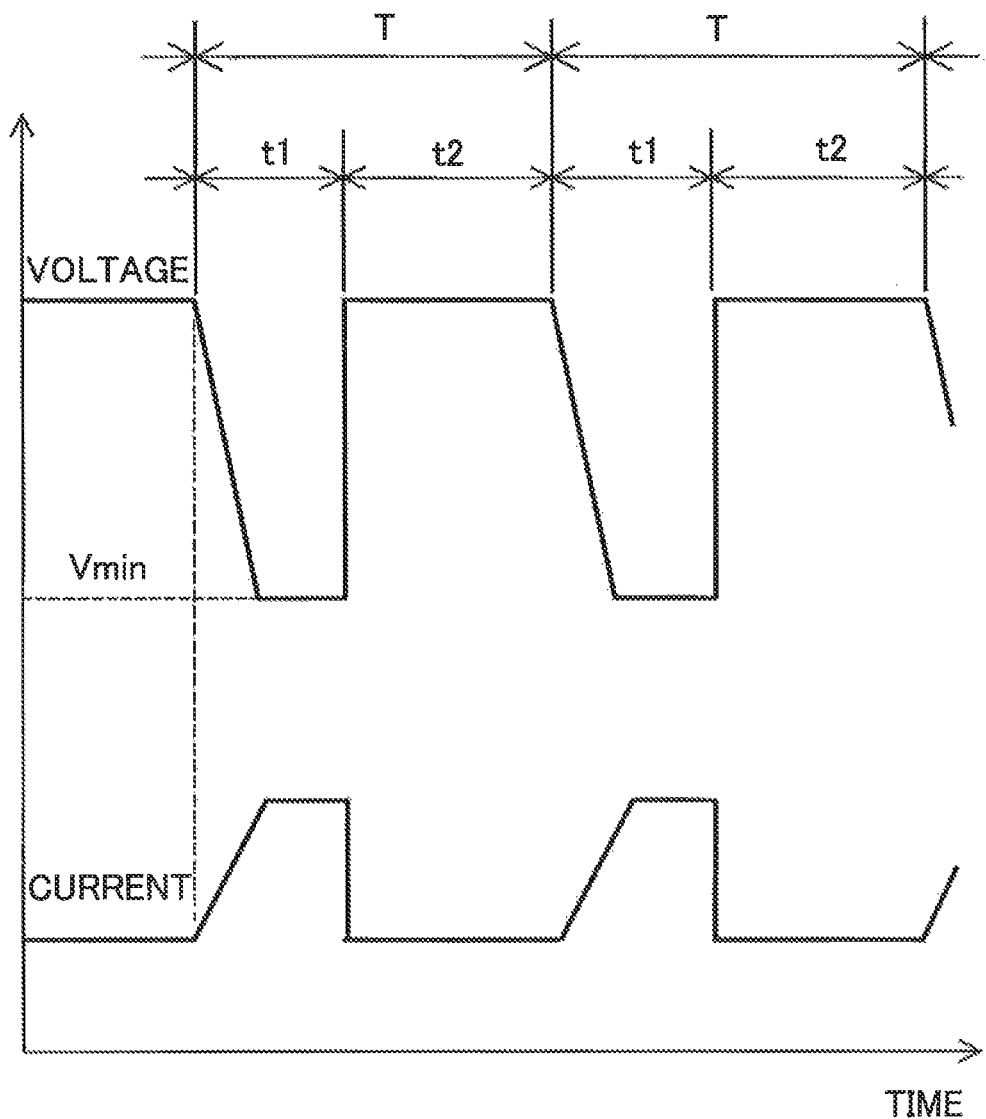
FIG. 8 is a diagram showing a process of determining a shift to an increased electric current and a decreased voltage in the temporary current increase control according to the SOC.
Figure 9:
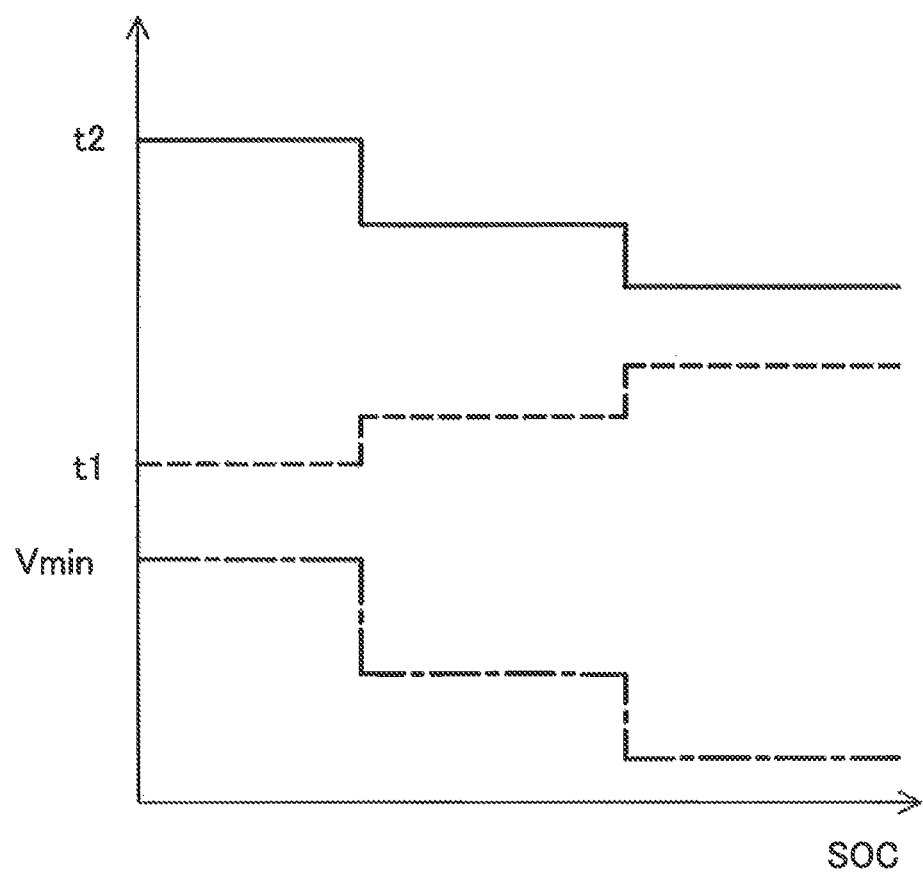
FIG. 9 is a diagram showing a process of determining a time interval T and a minimum voltage in the temporary current increase control according to the SOC.

On a negative answer at step S210 that indicates the unavailability of the temporary current increase control described above, the control procedure shifts to ordinary control described below. On an affirmative answer that indicates the availability of the temporary current increase control, on the other hand, the control procedure subsequently reads the cell temperature at step S220 and makes a comparison of the cell temperature (step S230). In the same manner as step S110 of the above embodiment, the controller 200 performs the ordinary control of the fuel cell 100 described above (step S240) or the temporary current increase control described above (step S250), based on the result of comparison between the cell temperature and the first temperature α. The ordinary control and the temporary current increase control of this embodiment also use the secondary battery 172 in combination according to the power demand for the motor 170. FIG. 8 is a diagram showing a process of determining a shift to an increased electric current and a decreased voltage in the temporary current increase control according to the SOC. FIG. 9 is a diagram showing a process of determining a time interval T and a minimum voltage in the temporary current increase control according to the SOC.

In the temporary current increase control triggered by the cell temperature exceeding the first temperature α, the control state is determined according to the SOC of the secondary battery 172 as described below. The current increase control repeats the temporary current increase control intermittently as described above and accordingly repeats the temporary current increase control and the ordinary control alternately. A time period t1 of the temporary current increase control, a time period t2 of the ordinary control, and a minimum voltage Vmin in the shift to the decreased voltage are specified according to the SOC of the secondary battery 172 as shown in FIG. 9. In this illustrated example, the time period t2 of the temporary current increase control increases stepwise with an increase in SOC of the secondary battery 172. In contrast, the time period t2 of the ordinary control and the minimum voltage Vmin in the shift to the decreased voltage decrease stepwise with an increase in SOC of the secondary battery 172. When the secondary battery 172 has high SOC, most of the power demand for the motor 170 is covered by the SOC. The fuel cell 100 is accordingly controlled to increase the degree of voltage decrease that contributes to reduction of the dryness of the electrolyte membrane 101 and to extend the time period t1 of the temporary current increase control, so as to further increase the amount of water production and enhance the effectiveness of reducing the dryness of the electrolyte membrane 101. The fuel cell vehicle 20 according to this embodiment performs the temporary current increase control similar to that of the above embodiment, thus enabling the power generation performance to be maintained and further enhancing the effectiveness of reducing degradation of the power generation performance even in the case that the high load operation of the fuel cell 100 is prolonged. Additionally, the fuel cell vehicle 20 determines the availability or the unavailability of the temporary current increase control according to the SOC of the secondary battery 172 and determines its control state. This enables the temporary current increase control that leads to the increased water production to be performed adequately to adjust the degree of the increased water production, while satisfying the power demand by the combined use of the secondary battery 172. Such control accordingly has significant contribution to reduction of the dryness of the electrolyte membrane 101 and associated recovery of the power generation performance.

Figure 10:
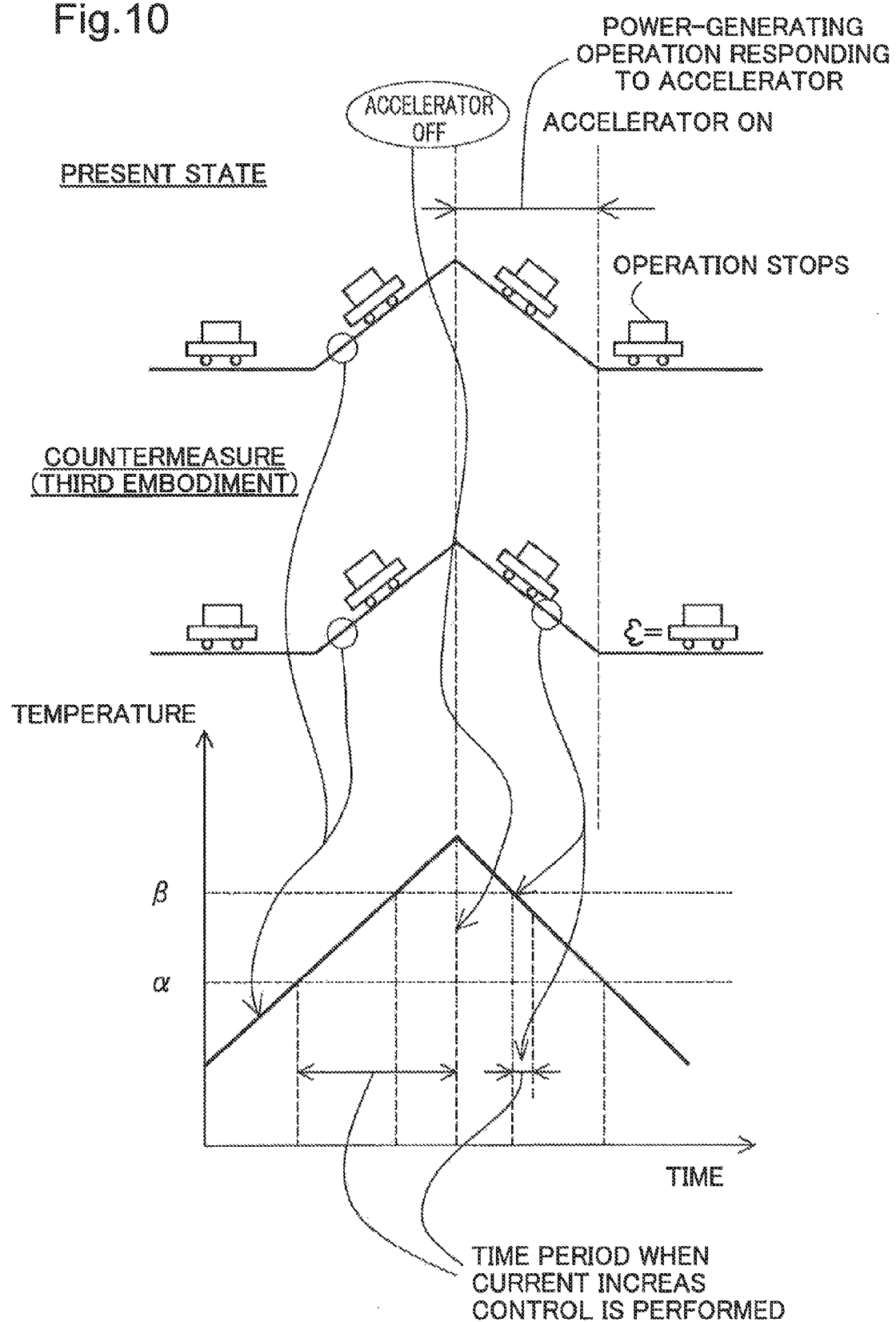
FIG. 10 is a diagram schematically illustrating a process of current increase control according to a third embodiment.
Figure 11:
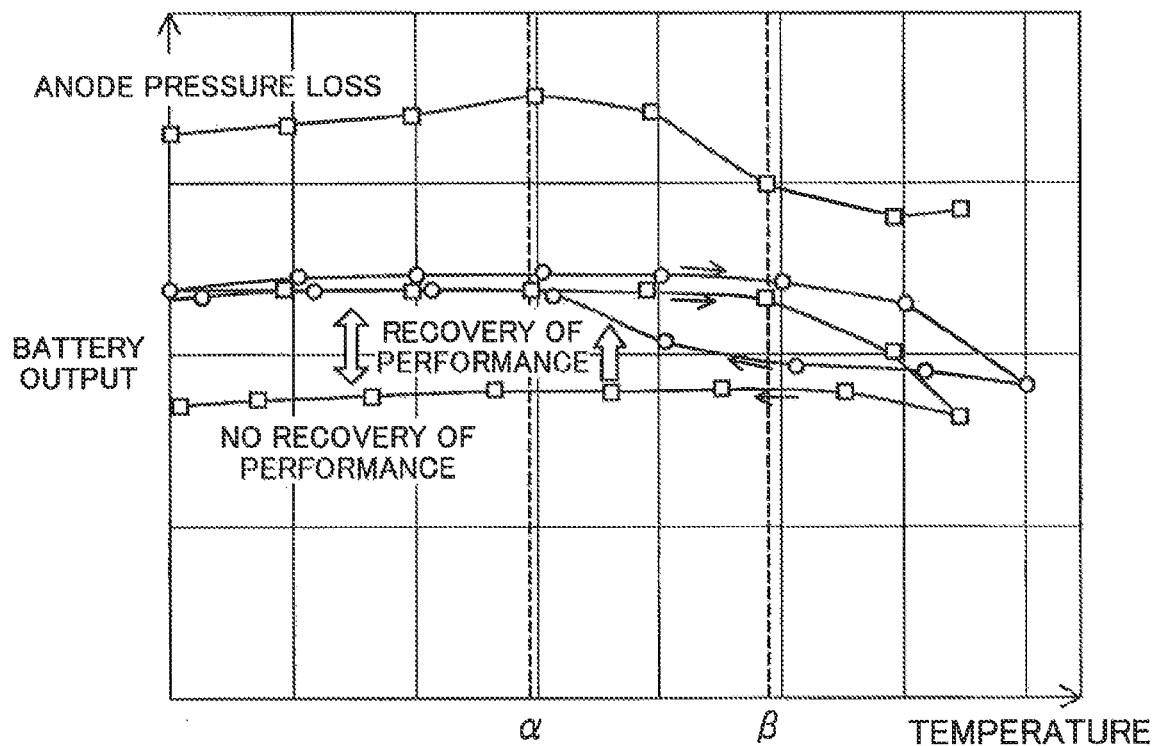
FIG. 11 is a graph showing changes in output of the fuel cell 100 and changes in anode pressure loss against the cell temperature with and without the current increase control.

FIG. 10 is a diagram schematically illustrating a process of current increase control according to a third embodiment. FIG. 11 is a graph showing changes in output of the fuel cell 100 and changes in anode pressure loss against the cell temperature with and without the current increase control. The third embodiment is characterized by the current increase control that is performed on cancellation of a power demand for the load.

During a long uphill drive as shown in FIG. 10, the high load operation of the fuel cell 100 (see FIG. 1) is continued, and the cell temperature gradually rises. When the temporary current increase control described in the above first embodiment or second embodiment is not performed, as shown in FIG. 11, the anode pressure loss starts decreasing at the cell temperature that reaches a first temperature of, as described above. As plotted with open squares in FIG. 11, the battery output has no significant decrease before the cell temperature reaches a second temperature β that is higher than the first temperature α, but abruptly decreases after the cell temperature exceeds this second temperature β. During a downhill drive subsequent to the uphill drive, the fuel cell 100 generally stops the power-generating operation, for example, in response to a release of the accelerator operation. Although this operation stop decreases the cell temperature, the battery output expected in the accelerator-on state is kept at the lower output level as plotted with open squares in FIG. 11. This is because the cell temperature increased by the high load operation during the uphill drive is maintained at the high level for some time even after the uphill drive. This leads to the increased dryness of the electrolyte membrane 101 even after the uphill drive and causes degradation of the power generation performance.

By taking into account this phenomenon, the third embodiment controls the operation of the fuel cell 100 as described below. The temporary current increase control similar to that of the first embodiment and the second embodiment described above is performed during the uphill drive. Such control, which reduces the dryness of the electrolyte membrane 101 during the uphill drive, enables the battery output to be kept at the higher level than that without the temporary current increase control even when the cell temperature exceeds the second temperature β, as plotted with open circles in FIG. 11. During the downhill drive subsequent to the uphill drive, the power-generating operation of the fuel cell 100 stops in response to a release of the accelerator operation as described above. When the cell temperature decreases to the second temperature β, however, the temporary current increase control (step S130 or S250) similar to that of the first embodiment and the second embodiment described above is performed again for a specified time period. This contributes to reduction of the dryness of the electrolyte membrane 101 and recovery of the power generation performance. This process is plotted with open circles in FIG. 11. In this case, at the timing of a subsequent accelerator operation after the downhill drive, the dryness of the electrolyte membrane 101 has already been reduced, so that power generation control of the fuel cell 100 can be performed in response to the accelerator operation without any substantial difficulty. The fuel cell vehicle 20 according to the third embodiment prevents the driver from feeling strange with a response to the driver's accelerator operation and thereby improves the drivability.

According to the third embodiment, the second temperature β at which the temporary current increase control starts is a temperature that corresponds to the inflection point of a change in anode pressure loss and that causes an abrupt decrease in battery output as shown in FIG. 11. When the cell temperature exceeds the second temperature β, it is thus expected that the electrolyte membrane 101 is excessively dried. Starting the temporary current increase control at the temperature exceeding the second temperature β prolongs continuation of the temporary current increase control for the purpose of reducing the dryness of the excessively dried electrolyte membrane 101. The third embodiment accordingly starts the temporary current increase control for the purpose of reduction of the dryness at the timing when the cell temperature decreases to the second temperature β.

Figure 12:
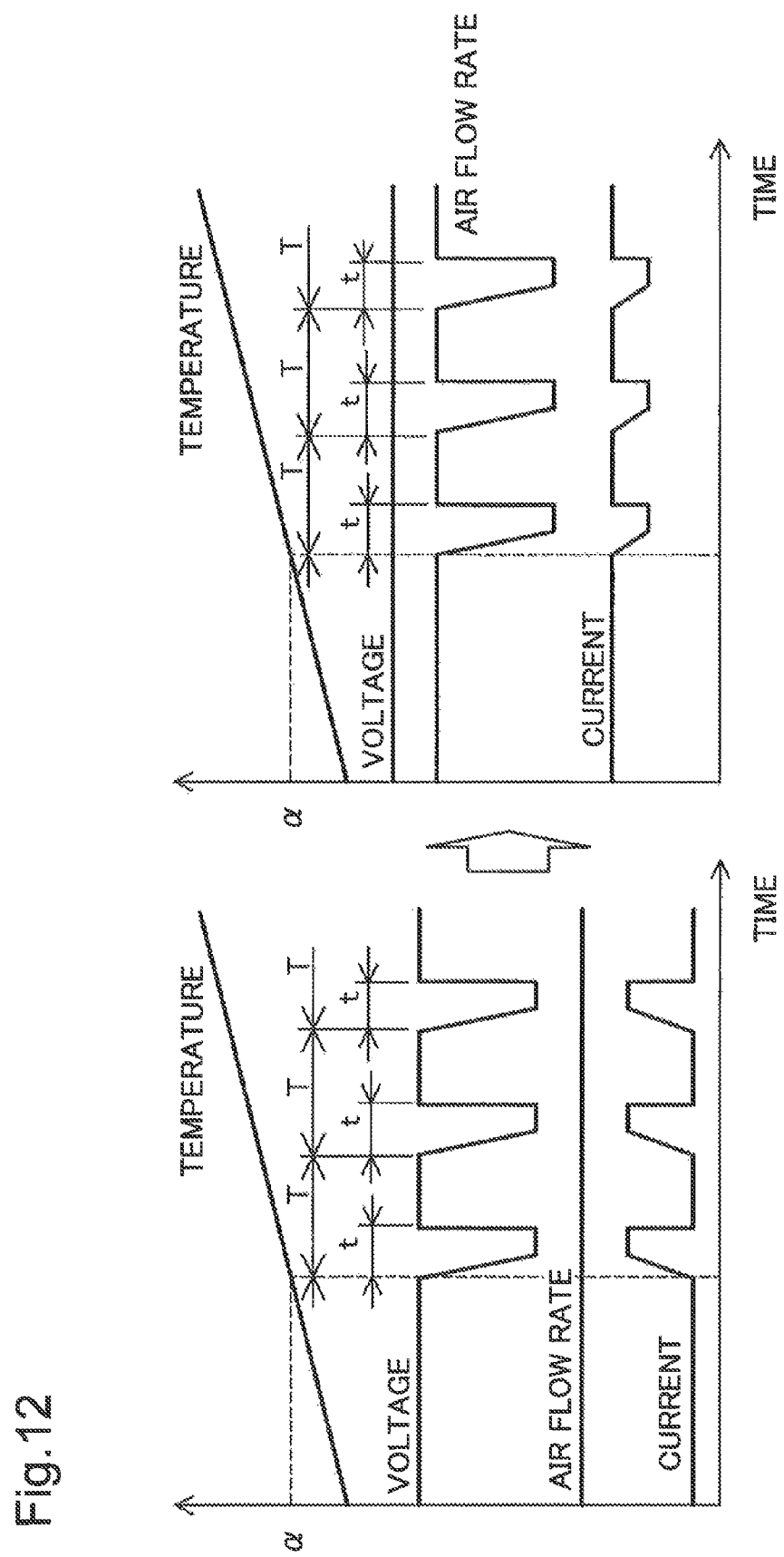
FIG. 12 is a diagram illustrating a process of water production increasing control according to a fourth embodiment.

FIG. 12 is a diagram illustrating a process of water production increasing control according to a fourth embodiment. The fourth embodiment is characterized by the water production increase performed by reduction of the air supply. As illustrated, this embodiment intermittently repeats reduction of the air supply in a time period t at time intervals T, instead of the temporary current increase control performed in the above embodiments. The reduction of the air flow rate leads to reduction in amount of water production on the cathode 103 but decreases the amount of produced water taken away by the excessive air flow, thus enabling the produced water to remain. The fourth embodiment increases the amount of water production per air supply and thereby reduces the dryness of the electrolyte membrane 101 as in the above embodiment. Additionally, this embodiment reduces consumption of the hydrogen gas accompanied with reduction of the air supply. This improves the fuel consumption, while contributing to reduction of the dryness of the electrolyte membrane 101.

Figure 13:
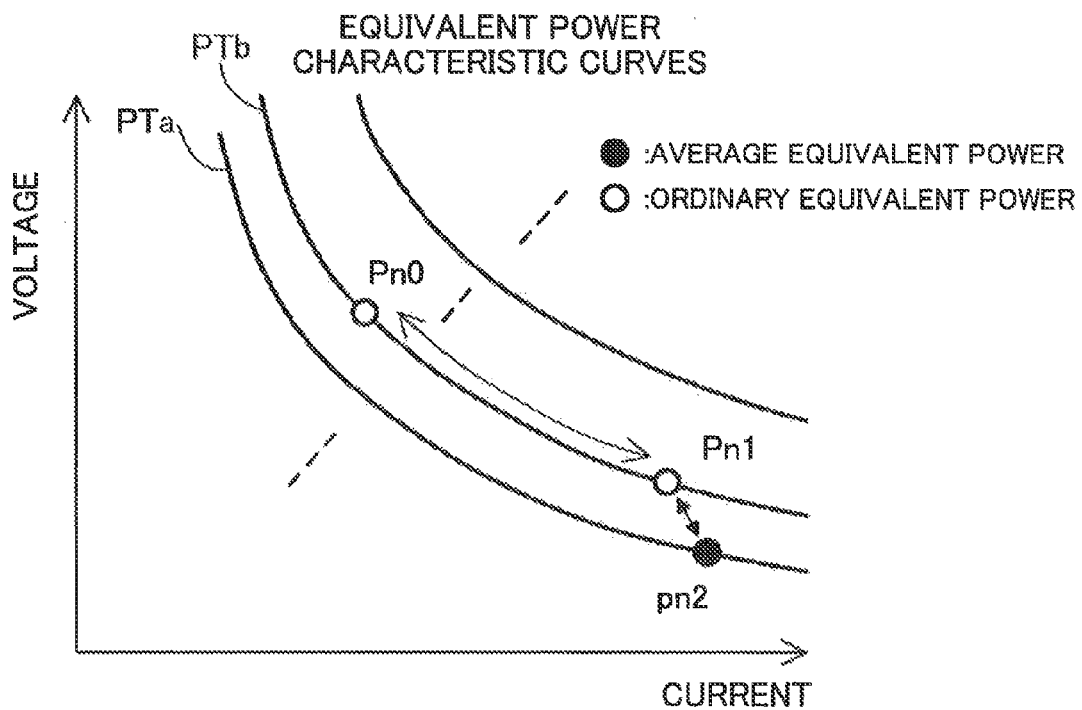
FIG. 13 is a diagram schematically showing equivalent power characteristic curves (IV characteristic curves) specific to the fuel cell 100, which correlate the electric current to the voltage and indicate the power-generating operation state of the fuel cell 100.
Figure 14:
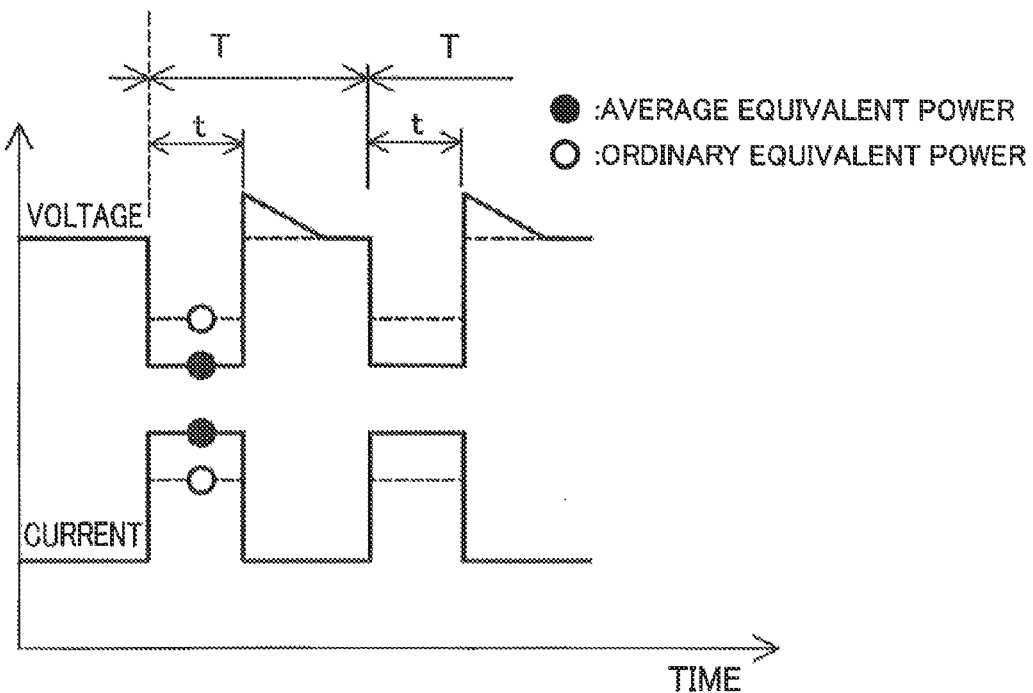
FIG. 14 is a diagram showing changes in electric current and changes in voltage during temporary current increase control with or without a shift between equivalent power characteristic curves.
Figure 15:
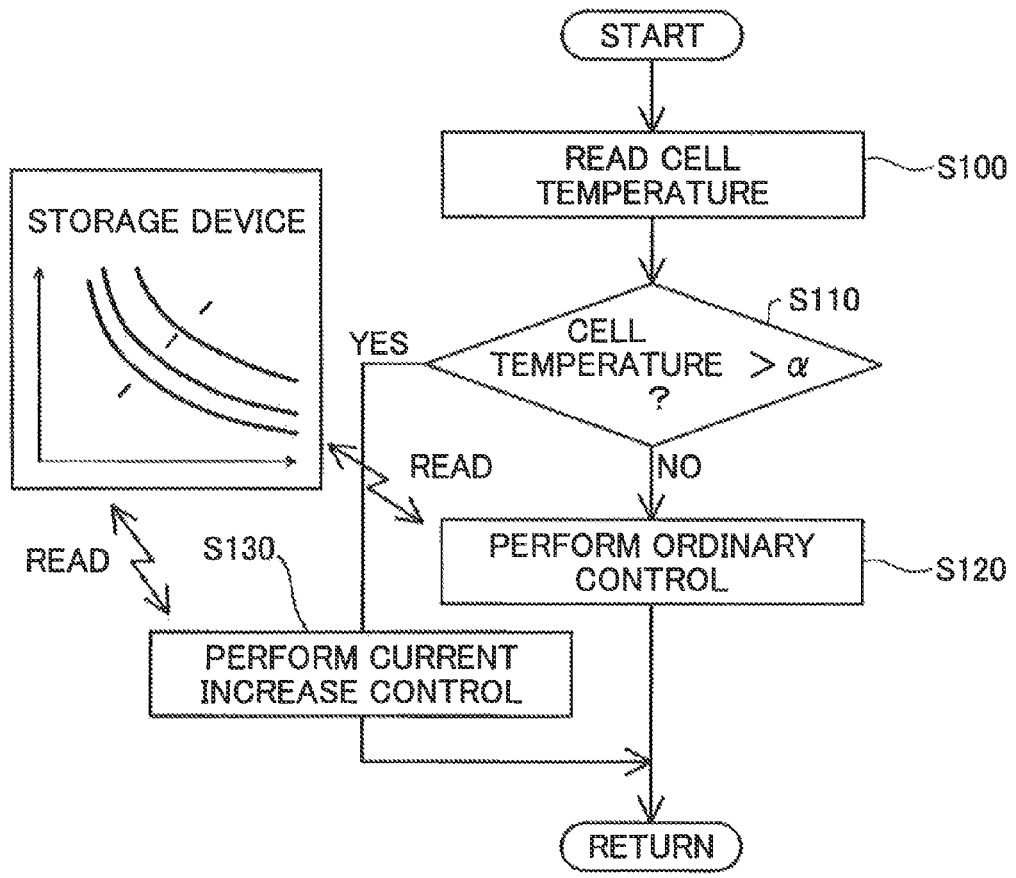
FIG. 15 is a flowchart showing the procedure of FIG. 2 in relation to reading the equivalent power characteristic curves.

The following describes a fifth embodiment that takes advantage of the characteristic specific to the fuel cell 100. FIG. 13 is a diagram schematically showing equivalent power characteristic curves (IV characteristic curves) specific to the fuel cell 100, which correlate the electric current to the voltage and indicate the power generating operation state of the fuel cell 100. FIG. 14 is a diagram showing changes in electric current and changes in voltage during temporary current increase control with or without a shift between equivalent power characteristic curves. FIG. 15 is a flowchart showing the procedure of FIG. 2 in relation to reading the equivalent power characteristic curves.

The fuel cell vehicle 20 (see FIG. 1) has maps corresponding to the respective equivalent power characteristic curves shown in FIG. 13 stored in advance in a ROM of the controller 200 or in another memory device, prior to execution of the power-generating operation control of the fuel cell 100. As shown in FIG. 15, the procedure of the fifth embodiment reads an equivalent power characteristic curve corresponding to the power demand for, e.g., the motor 170 (step S120), prior to execution of the current increase control described above. The ordinary control of step S120 performed in response to a negative answer at step S110 operates the fuel cell 100 with the electric current and the voltage on the read equivalent power characteristic curve (for example, equivalent power characteristic curve PTb in FIG. 13) and thereby performs the power-generating operation of the fuel cell 100 according to the power demand for the load.

In response to an affirmative answer at step S110 that suggests the potential for degradation of the power generation performance caused by drying of the membrane as described above, on the other hand, the current increase control of step S130 performs the temporary current increase control in a time period t as described below. In FIGS. 13 and 14, open circles indicate a control process that causes a current-voltage shift for the temporary current increase control in the time period t along the equivalent power characteristic curve PTb based on the power demand. More specifically, this control process shifts the electric current, and the voltage from an operation point Pn during the ordinary control of step S120 to an operation point Pn1 having an increased electric current and a decreased voltage. The fuel cell 100 is then operated at this operation point Pn1 in the time period t. The control process subsequently shifts back the electric current and the voltage to the original operation point Pn prior to the shift to the increased electric current and the decreased voltage. Such control causes a current-voltage shift along the equivalent power characteristic curve based on the power demand and is thus regarded as control of ordinary equivalent power.

Closed circles, on the other hand, indicate a control process that causes a current-voltage shift for the temporary current increase control with additional consideration of a current-voltage shift between the equivalent power characteristic curve PTb based on the power demand and an equivalent power characteristic curve PTa of the lower power generation level. More specifically, this control process reads the equivalent power characteristic curve PTa, which has the lower power generation level than that of the equivalent power characteristic curve PTb based on the power demand (step S130). The control process subsequently shifts the electric current and the voltage from the operation point Pn during the ordinary control of step S120 to an operation point Pn2, which is on the equivalent power characteristic curve PTa having the lower power generation level than that of the equivalent power characteristic curve PTb and has a further increased electric current and a further decreased voltage. The fuel cell 100 is then operated at this operation point Pn2 in the time period t. The control process subsequently Shifts back the electric current and the voltage to the original operation point Pn prior to the shift to the increased electric current and the decreased voltage. The shift from the operation point Pn to the operation point Pn2 may be a direct shift from the operation point Pn to the operation point Pn2 or may be a shift via the operation point Pn1 to the operation point Pn2. Such control causes a current-voltage shift between the equivalent power characteristic curves of the different power generation levels, but the power generation level is substantially averaged before and after the shift as shown by the solid line curves in FIG. 14. This control is thus regarded as control of average equivalent power.

When the increased cell temperature leads to the increased dryness of the membrane and causes degradation of the power generation performance (affirmative answer at step S130), both the ordinary equivalent power control and the average equivalent power control described above shift the electric current and the voltage from the operation point Pn during the ordinary control of step S120 to the operation point of the increased electric current and the decreased voltage. Both the controls accordingly contribute to reduction of the dryness of the membrane and thereby reduction of degradation of the power generation performance as described above. Both the controls enable the power-generating operation of the fuel cell 100 with the electric current and the voltage on the equivalent power characteristic curve specific to the fuel cell 100, thus ensuring stable power output. Additionally, in order to achieve a current-voltage shift for the temporary current increase control, both the controls simply need only adjustment of the electric power and the voltage of the fuel cell 100 but do not need power generating operation control with additional consideration of the power supply from the secondary battery 172 provided as another power source.

The average equivalent power control that causes a current-voltage shift between the equivalent power characteristic curve PTb and the equivalent power characteristic curve PTa of the lower power generation level has the more significantly increased electric current and the more significantly decreased voltage during the temporary current increase control in the time period t. This accelerates reduction of the dryness of the membrane, cooling of the catalyst by the increased water production and removal of adsorbed impurities as described above. Recovery of the power generation performance is accordingly expected during control (ordinary control) subsequent to the temporary current increase control in the time period t. This recovery is indicated as an increase in voltage level in FIG. 14.

The foregoing describes the invention with reference to some embodiments. The invention is, however, not limited to the above embodiments or their modifications, but a multiplicity of variations and modifications may be made to the embodiments without departing from the scope of the invention. For example, the procedure of the above embodiment correlates the dryness of the electrolyte membrane 101 to the cell temperature and determines the need to reduce the dryness of the electrolyte membrane 101 when the cell temperature exceeds the first temperature α. This control procedure is, however, not restrictive. The cell temperature may be replaced by another fuel cell property that reflects the dryness of the electrolyte membrane 101. For example, a change in anode pressure loss or a change in internal resistance may be detected. Observation of a specified phenomenon caused by drying of the electrolyte membrane 101, for example, a decrease in anode pressure loss or an increase in internal resistance as shown by the plot with open squares in FIG. 4, suggests the increased dryness of the electrolyte membrane 101, which may lead to degradation of the power generation performance of the fuel cell 100. The control procedure may thus determine the need to reduce the dryness of the membrane and thereby reduce degradation of the power generation performance and may perform the current increase control (temporary current increase control) of step S130.

In this case, the degradation of the power generation performance of the fuel cell 100 may be observed as a change in battery output or as a change in current-voltage characteristic of the fuel cell 100, instead of as the change in dryness of the electrolyte membrane 101, the change in anode pressure loss or the change in internal pressure described above. The control procedure may measure (observe) the battery output or the current-voltage characteristic of the fuel cell 100 or estimate the battery output or the current-voltage characteristic based on specified theoretical calculation, in order to detect a shift to a performance degradation state that has potential for degradation of the power generation performance of the fuel cell 100. The control procedure may then repeat the temporary current increase control and the subsequent ordinary control as described above. More specifically, when the battery output or the current-voltage characteristic of the fuel cell 100 changes through a predetermined threshold value to a value of the further output decrease or to a value of the further characteristic degradation, the control procedure determines a shift to the performance degradation state that has potential for degradation of the power generation performance and alternately repeats the temporary current increase control and the subsequent ordinary control described above. When the battery output or the current-voltage characteristic of the fuel cell 100 is recovered to the predetermined threshold value, the control procedure stops the temporary current increase control.

Figure 16:
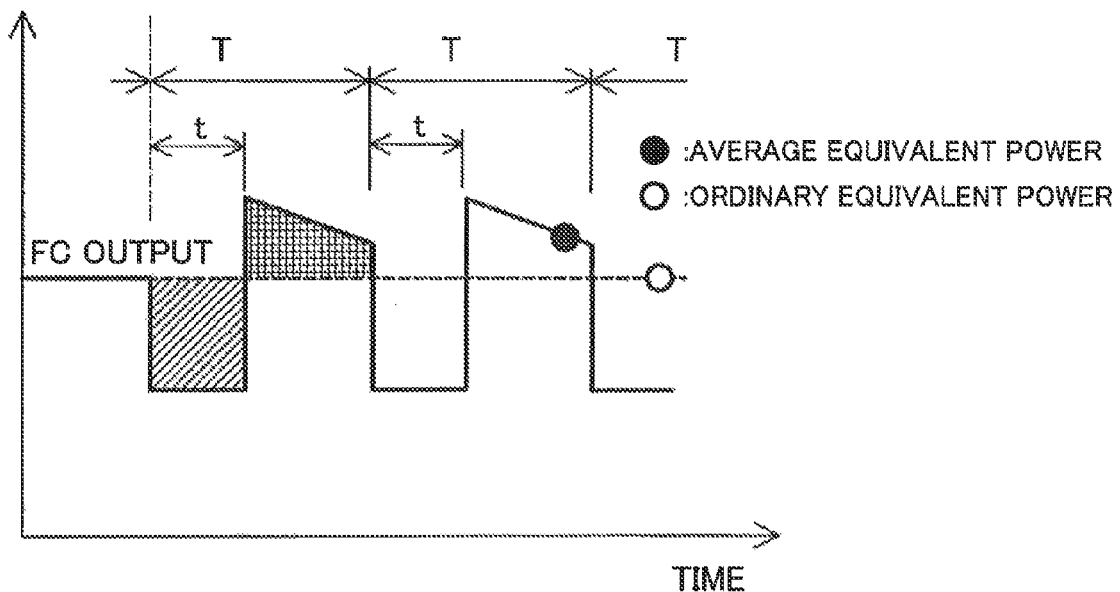
FIG. 16 is a diagram showing an output scheme employable for the temporary current increase control.

An output scheme described below may be employed for the temporary current increase control using the equivalent power characteristic curves described in FIGS. 13 and 14. FIG. 16 is a diagram showing an output scheme employable for the temporary current increase control. FIG. 16 shows a change in output of generated power when the average equivalent power control with additional consideration of the current-voltage shift between the equivalent power characteristic curve PTb based on the power demand and the equivalent power characteristic curve PTa is employed to repeat the temporary current increase control and the subsequent ordinary control. According to the output scheme of FIG. 16, the difference between the power demand for the load and a power output of the increased electric current and the decreased voltage via a current-voltage shift (Pn→Pn2: temporary current increase control) from the equivalent power characteristic curve PTb to the equivalent power characteristic curve PTa is made equal to the difference between the power demand for the load and a power output of the decreased electric current and the increased voltage via a current-voltage shift (Pn2→Pn: ordinary control) from the equivalent power characteristic curve PTa to the equivalent power characteristic curve PTb. For this purpose, the time period t included in the time interval T is determined by taking into account the differences of the electric current and the voltage between the operation point Pn and the operation point Pn2. This output scheme may be provided in advance in the form of a map according to the required load, in other words, when a required load is specified, an equivalent power characteristic curve based on the required load (for example, equivalent power characteristic curve PTb) and an equivalent power characteristic curve PTa of the lower power generation level are specified. This leads to specification of the respective operation points on these characteristic curves and thereby enables the output scheme to be provided in the form of a map.

As shown in FIG. 1, the fuel cell vehicle 20 has the secondary battery 172 that is capable of charging and discharging electric power, in combination with the fuel cell 100, as the power source to supply power to, for example, the motor 170. The secondary battery 172 is generally controlled to compensate for a shortage of the output of the fuel cell 100. The output scheme of making the decrease in output by the increased electric current and the decreased voltage equal to the recovery of output by the decreased electric current and the increased voltage as described above, however, apparently has no shortage of the output of the fuel cell 100. This causes no need of power supply from the secondary battery 172 for the purpose of compensating for a shortage of the output power or causes no variation in power supply, thus reducing the power consumption of the secondary battery 172. When the ordinary equivalent power control of shifting the electric current and the voltage along the equivalent power characteristic curve PTb based on the power demand is employed to repeat the temporary current increase control and the subsequent ordinary control, the fuel cell 100 has a constant output power. This also causes no need of power supply from the secondary battery 172 for the purpose of compensating for a shortage of the output power or causes no variation in power supply, thus reducing the power consumption of the secondary battery 172.

The above embodiment performs the ordinary control in the time period (T-t) subsequent to the temporary current increase control in the time period t. The control subsequent to the temporary current increase control in the time period t is, however, not limited to the ordinary control but may be any control that enables reduction in increase of water production, compared with the temporary current increase control.

Figure 17:
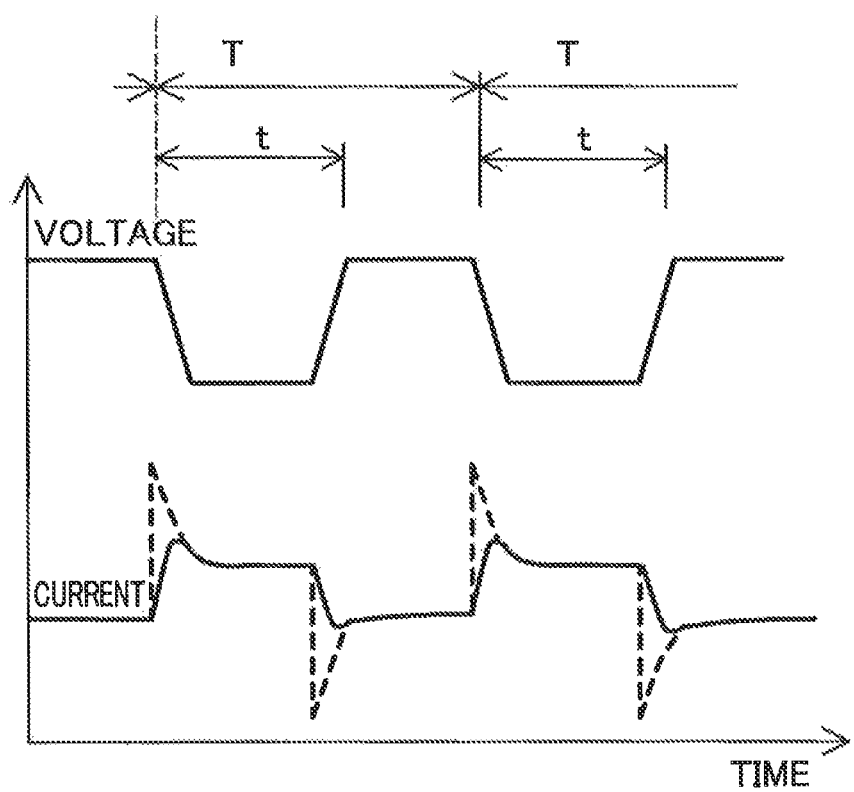
FIG. 17 is a diagram showing a state of voltage increase/decrease in the course of alternately repeating temporary current increase control and subsequent control (control to reduce an increase of water production).

A modification described below may be employed for the voltage increase/decrease control according to the above embodiment. FIG. 17 is a diagram showing a state of voltage increase/decrease in the course of alternately repeating the temporary current increase control and the subsequent control (control to reduce the increase of water production). As shown in FIG. 17, the voltage is changed to have a gradual decrease or a gradual increase in the course of decreasing the voltage accompanied with the temporary current increase control and in the course of increasing the voltage accompanied with the temporary current increase control and the subsequent control. Such control prevents an abrupt change in electric current, i.e., current spike, in the course of alternately repeating the temporary current increase control and the subsequent control (control to reduce the increase of water production) and is thus advantageous for protecting the electrolyte membrane 101 from damage.

The control procedure according to the above embodiment alternately repeats the temporary current increase control and the ordinary control at the time intervals T, while the cell temperature exceeds the first temperature α and subsequently decreases to the first temperature α. In one modification, the control procedure may alternately repeat the temporary current increase control and the ordinary control at the time intervals T for a predetermined time after the cell temperature exceeds the first temperature α. Such modification may also be employed in the application of measuring or estimating the battery resistance, the battery output or the current-voltage characteristic and detecting a shift to the performance degradation state having potential for degradation of the power generation performance of the fuel cell.

REFERENCE SIGNS LIST

20 Fuel cell vehicle
22 Vehicle body
30 Fuel cell system
100 Fuel cell
101 Electrolyte membrane
102 Anode
103 Cathode
104 Anode-side gas diffusion layer
105 Cathode-side gas diffusion layer
106 Current sensor
110 Hydrogen gas tank
120 Hydrogen gas supply system
121 Hydrogen supply path
122 Circulation path
123 Release path
124 On-off valve
125 Pressure reducing valve
126 Hydrogen supply device
127 Circulation pump
128 Flow rate sensor
129 On-off valve
130 Compressor
140 Air supply system
141 Oxygen supply path
142 Release path
143 Discharge flow control valve
145 Humidification device
147 Flow rate sensor
150 Radiator
152 Fan
160 Cooling system
161 Circulation path
162 Bypass path
163 Three-way flow control valve
164 Circulation pump
166 Temperature sensor
170 Motor
172 Secondary battery
176 Capacity sensor
180 Accelerator
182 Vehicle speed sensor
184 Ambient temperature sensor
200 Controller
174 DC-DC converter
FW Front wheels
RW Rear wheels

The invention claimed is:

1. A fuel cell system, comprising:
a fuel cell configured to receive a fuel gas and an oxygen-containing gas respectively supplied to an anode and a cathode, which are placed to face each other across an electrolyte membrane having proton conductivity, and generate electric power;
a power generation controller configured to perform load-responding power generation control that controls power-generating operation of the fuel cell based on a power demand for an external load; and
a secondary battery capable of charging and discharging electric power to be usable in combination with the fuel cell, as a power source to supply power to the load,
wherein the power generation controller is configured such that when the fuel cell is in a performance degradation state that has potential for degradation of power generation performance of the fuel cell, the power generation controller performs water production increasing control, which shifts a power-generating operation state of the fuel cell to a state of increasing an amount of water production on the cathode compared with the load-responding power generation control, and subsequently performs water production non-increasing control, which shifts the power-generating operation state of the fuel cell to a state of reducing an increase in amount of water production compared with the water production increasing control,
wherein the power generation controller is configured to oscillate between the water production increasing control and the water production non-increasing control in the performance degradation state,
wherein the power generation controller is configured such that when performing the water production increasing control, the power generation controller shifts the power-generating operation state of the fuel cell to a state of an increased electric current and a decreased voltage to increase an amount of water production on the cathode, and when performing the water production non-increasing control, the power generation controller shifts the power-generating operation state of the fuel cell to a state of decreased electric current region and increased voltage region compared with the water production increasing control to suppress an increase in the amount of water production compared with the water production increasing control, and
wherein the power generation controller is configured to compare the state of charge of the secondary battery and a predetermined threshold range, the threshold range becoming a low threshold range at a cell temperature in an intermediate temperature range, the threshold range becoming a high threshold range at a cell temperature in a low temperature range where the threshold range becomes higher than the low threshold range as the temperature range becomes lower than the intermediate temperature range, and the threshold range becoming a high threshold range at a cell temperature in a high temperature range where the threshold range becomes higher than the low threshold range as the temperature range becomes higher than the intermediate temperature range, and wherein the power generation controller is configured such that when the state of charge of the secondary battery exceeds the predetermined threshold range, the power generation controller determines availability of the water production increasing control.

2. The fuel cell system according to claim 1, wherein the power generation controller is configured to perform the load-responding power generation control as the water production non-increasing control.

3. The fuel cell system according to claim 1, wherein the power generation controller is configured to oscillate between the water production increasing control and the water production non-increasing control at a predetermined time interval T.

4. The fuel cell system according to claim 1, wherein the power generation controller is configured such that an equivalent power characteristic curve specific to the fuel cell is stored with regard to each power generation level, wherein the equivalent power characteristic curve correlates an electric current to a voltage and indicates the power-generating operation state of the fuel cell, and the power generation controller is configured such that the power generation controller reads an equivalent power characteristic curve of a power generation level corresponding to the power demand and controls power-generating operation of the fuel cell to meet an electric current and a voltage on the read equivalent power characteristic curve, as the load-responding power generation control, while controlling power-generating operation of the fuel cell to meet an electric current and a voltage on the equivalent power characteristic curve to achieve the shift to the state of the increased electric current and the decreased voltage, as the water production increasing control.

5. The fuel cell system according to claim 4, wherein the power generation controller is configured such that the power generation controller reads an equivalent power characteristic curve of a lower power generation level than the power generation level corresponding to the power demand and controls power-generating operation of the fuel cell to meet an electric current and a voltage on the read equivalent power characteristic curve, in order to achieve the shift to the state of the increased electric current and the decreased voltage, as the water production increasing control.

6. The fuel cell according to claim 1, wherein the power generation controller is configured such that the power generation controller oscillates between the water production increasing control and the water production non-increasing control, so as to make a difference between the power demand for the load and a power output of the fuel cell by the shift to the state of the increased electric current and the decreased voltage associated with the water production increasing control equal to a difference between the power demand for the load and a power output of the fuel cell by the shift to the lower electric current level and the higher voltage level associated with the water production non-increasing control.

7. The fuel cell system according to claim 1, wherein the power generation controller is configured such that the power generation controller determines the shift of the power-generating operation state of the fuel cell to the state of the increased electric current and the decreased voltage based on the state of charge of the secondary battery and performs the water production increasing control according to the determined shift.

8. The fuel cell system according to claim 1, wherein the power generation controller is configured to stop the water production increasing control on cancellation of the power demand for the load after intermittently repeating the water production increasing control, and the power generation controller intermittently is configured to repeat the water production increasing control over a predetermined time period in a load cancellation term until appearance of a new power demand for the load after cancellation of the power demand.

9. The fuel cell system according to claim 8, wherein the power generation controller is configured to perform the water production increasing control in the load cancellation term, in a state estimated to have degradation of the power generation performance of the fuel cell by drying of the electrolyte membrane.

10. The fuel cell system according to claim 9, wherein the power generation controller is configured to perform the water production increasing control in the load cancellation term, when a detected fuel cell temperature of the fuel cell decreases from a temperature where the power demand is cancelled to a predetermined temperature.

11. The fuel cell system according to claim 1, wherein the power generation controller is configured to intermittently reduce a supply of the oxygen-containing gas during repetition of the water production increasing control.

12. A vehicle equipped with the fuel cell system according to claim 1, wherein electric power generated by the fuel cell included in the fuel cell system is provided to a motor.

13. The fuel cell system according to claim 7, wherein the power generation controller is configured to determine the shift in such a way that a time period of performing the water production increasing control is extended in a phased manner as the state of charge of the secondary battery shifts to a state of increasing an amount of charge.

14. The fuel cell system according to claim 1, wherein the performance degradation state that has potential for degradation of power generation performance of the fuel cell is a state of hill climbing or a state where the load on the fuel cell is increased for a prolonged period of time.

* * * * *